(12) United States Patent
Deenoo et al.

(10) Patent No.: US 11,848,718 B2
(45) Date of Patent: Dec. 19, 2023

(54) RADIO RESOURCE MANAGEMENT IN WIRELESS SYSTEMS

(71) Applicant: InterDigital Patent Holdings, Inc., Wilmington, DE (US)

(72) Inventors: Yugeswar Deenoo, Chalfont, PA (US); Mouna Hajir, Montreal (CA); Patrick Tooher, Montreal (CA); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/534,577

(22) Filed: Aug. 7, 2019

(65) Prior Publication Data

US 2020/0052803 A1 Feb. 13, 2020

Related U.S. Application Data

(60) Provisional application No. 62/790,199, filed on Jan. 9, 2019, provisional application No. 62/736,048, filed
(Continued)

(51) Int. Cl.
*H04B 17/327* (2015.01)
*H04W 36/30* (2009.01)
(Continued)

(52) U.S. Cl.
CPC .... *H04B 17/327* (2015.01); *H04W 36/00835* (2018.08); *H04W 36/30* (2013.01);
(Continued)

(58) Field of Classification Search
CPC .. H04B 17/327; H04B 17/382; H04B 17/318; H04W 36/30; H04W 36/00835;
(Continued)

(56) References Cited

U.S. PATENT DOCUMENTS

2006/0142021 A1* 6/2006 Mueckenheim ...... H04W 36/22
455/450
2011/0306346 A1* 12/2011 Yoon ..................... H04W 36/30
455/437
(Continued)

OTHER PUBLICATIONS

3rd Generation Partnership Project (3GPP), TS 38.331 V15.0.0, "Technical Specification Group Radio Access Network NR Radio Resource Control (RRC) Protocol Specification (Release 15)", Dec. 2017, pp. 1-188.

*Primary Examiner* — Benjamin H Elliott, IV
(74) *Attorney, Agent, or Firm* — Condo Roccia Koptiw LLP

(57) ABSTRACT

A wireless device for determining wireless channel metrics and/or cell quality when accessing wireless resources. For example, the wireless device may use the determined channel metrics and/or cell quality when performing cell selection and/or cell reselection procedures. The wireless device may use the determined channel metrics and/or cell quality to trigger and report cell or frequency measurements in one or more cells neighboring the device's serving cell. The wireless device may use (e.g., further use) the determined channel metrics and/or cell quality to select a beam or sub-band for initial access to a cell. The wireless device may be employed within a wireless communications network that utilizes unlicensed wireless spectrum.

18 Claims, 7 Drawing Sheets

Related U.S. Application Data on Sep. 25, 2018, provisional application No. 62/715,543, filed on Aug. 7, 2018.

(51) Int. Cl.
| | |
|---|---|
| *H04W 36/00* | (2009.01) |
| *H04W 74/08* | (2009.01) |
| *H04W 48/16* | (2009.01) |
| *H04W 48/20* | (2009.01) |
| *H04W 48/12* | (2009.01) |

(52) U.S. Cl.
CPC ............ *H04W 48/12* (2013.01); *H04W 48/16* (2013.01); *H04W 48/20* (2013.01); *H04W 74/0816* (2013.01)

(58) Field of Classification Search
CPC . H04W 74/0816; H04W 48/16; H04W 48/20; H04W 48/12; H04W 36/0058; H04W 36/22; H04W 16/14
See application file for complete search history.

(56) References Cited

U.S. PATENT DOCUMENTS

| | | | |
|---|---|---|---|
| 2015/0131585 A1* | 5/2015 | Chen | H04L 5/0037 370/329 |
| 2015/0373603 A1* | 12/2015 | Jung | H04W 36/22 370/331 |
| 2016/0029295 A1* | 1/2016 | Nagasaka | H04B 17/318 370/237 |
| 2017/0188252 A1* | 6/2017 | Miao | H04W 8/02 |
| 2018/0176956 A1* | 6/2018 | Koutsimanis | H04W 74/0808 |
| 2018/0184475 A1* | 6/2018 | Babaei | H04L 5/0035 |
| 2018/0255473 A1* | 9/2018 | Kim | H04W 24/10 |
| 2018/0323848 A1* | 11/2018 | Mizusawa | H04B 7/0626 |
| 2019/0082462 A1* | 3/2019 | Bergström | H04W 74/0808 |
| 2020/0052803 A1* | 2/2020 | Deenoo | H04B 17/318 |
| 2020/0059841 A1* | 2/2020 | Zhang | H04W 36/0085 |
| 2021/0084583 A1* | 3/2021 | Niu | H04W 48/20 |
| 2021/0297170 A1* | 9/2021 | Niu | H04B 7/0632 |

* cited by examiner

RADIO RESOURCE MANAGEMENT IN WIRELESS SYSTEMS

CROSS-REFERENCE TO RELATED APPLICATIONS

This non-provisional patent application claims the benefit of U.S. Provisional Patent Application No. 62/715,543, filed Aug. 7, 2018; U.S. Provisional Patent Application No. 62/736,048, filed Sep. 25, 2018; and U.S. Provisional Patent Application No. 62/790,199, filed Jan. 9, 2019; the contents of which are hereby incorporated by reference in their entirety.

BACKGROUND

In wireless communication systems that utilize licensed spectrum, a wireless device may evaluate a quality of a cell based on the power and/or quality of a cell's reference signal (RS) to ensure that it may be camping on an optimal cell. This may minimize interference with one or more neighboring cells. However, the wireless device's ability to access the cell may be controlled or coordinated by the wireless network, such as via a base station. In wireless communication systems that utilize unlicensed spectrum, access to bandwidth resources may not be controlled, or may only be partly controlled by the network. The unlicensed spectrum may be shared by multiple wireless operators and/or may comprise different radio access technologies (RATs), such as LTE/New Radio (NR) and WiFi. As such, access to bandwidth resources in the unlicensed spectrum may be at the direction or control of one or more (e.g. each) wireless device that may be attempting to access the unlicensed spectrum. But coexistence issues (e.g., increased collisions and access delays) may arise when multiple wireless devices attempt to access the unlicensed spectrum at a time (e.g. a similar time or a same time).

SUMMARY

A wireless transmit/receive unit (WTRU) may be used for performing a measurement in a connected mode. The WTRU may comprise a memory and a processor. The processor may be configured to perform a number of actions. A measurement configuration comprising a cell strength of a serving cell and a load threshold for the serving cell may be received. It may be determined whether a measurement condition exists. The measurement condition may indicate whether a reference signal received power (RSRP) of the serving cell may be less than the cell strength of the serving cell, or a load of the serving cell may be greater than the load threshold for the serving cell. For example, the load may correspond to a channel busy ratio, a channel occupancy ratio, and/or the like. A neighboring cell measurement may be performed when the measurement condition exists. A WTRU may determine that it does not have to perform the neighboring cell measurement when the measurement condition does not exist.

A wireless device may be configured to determine one or more wireless channel metrics (e.g., channel status, channel occupancy, channel availability, and/or the like) and/or a cell quality when accessing wireless resources. The wireless device may use the determined one or more channel metrics and/or the cell quality when performing cell selection and/or cell reselection procedures. The wireless device may use the determined one or more channel metrics and/or the cell quality to trigger and report cell or frequency measurements in one or more cells that may be neighboring the device's serving cell. The wireless device may use the determined one or more channel metrics and/or the cell quality to select a beam or sub-band for initial access to a cell. The wireless device may be employed within a wireless communications network that utilizes unlicensed wireless spectrum. The unlicensed spectrum may be shared by one or more (e.g., multiple) wireless operators and/or be made up of different radio access technologies (RATs).

A WTRU may be configured to measure channel occupancy/availability at one more (e.g. different) levels of granularity. The levels of granularity may include a beam level, a sub-band level, a pair level (e.g. beam and sub-band), and/or the like. Cell quality may be derived using beams that may satisfy channel occupancy/availability criteria. A determination of cumulative channel occupancy/availability to avoid hidden nodes may be made. Cell selection criteria may be based on channel occupancy/availability and may be used in a cell selection procedure, such as a two-part cell selection procedure. One or more rules for intra-frequency and/or inter-frequency measurements may be based on channel occupancy/availability. Channel occupancy may be based on a scaling of one or more cell reselection parameters. One or more intra/inter-frequency reselection rules may be based on channel occupancy/availability. A beam and/or sub-band resource selection may be based on channel occupancy/availability.

One or more offsets for cell (re)selection may be based on cell operating mode. A WTRU may transmit an indication(s) of cell reselection that may be based on a different mode associated with a camped WTRU (e.g., new camped WTRU) on a cell. For example, a WTRU may be camping in a serving cell and may be in an IDLE or inactive mode.

One or more cells may be decoupled for a paging reception. One or more cells may be used for a random access (RA) attempt, which may be triggered by a paging message.

One or more measurement reports may be triggered based on channel occupancy/availability. A WTRU may use a measurement object (e.g., per sub-band) for channel occupancy measurement and/or RSSI measurement. A WTRU may determine a channel load, for example, based on signal detection from one or more neighboring nodes.

BRIEF DESCRIPTION OF THE DRAWINGS

Furthermore, like reference numerals in the figures indicate like elements, and wherein.

DETAILED DESCRIPTION

Figure 1A:
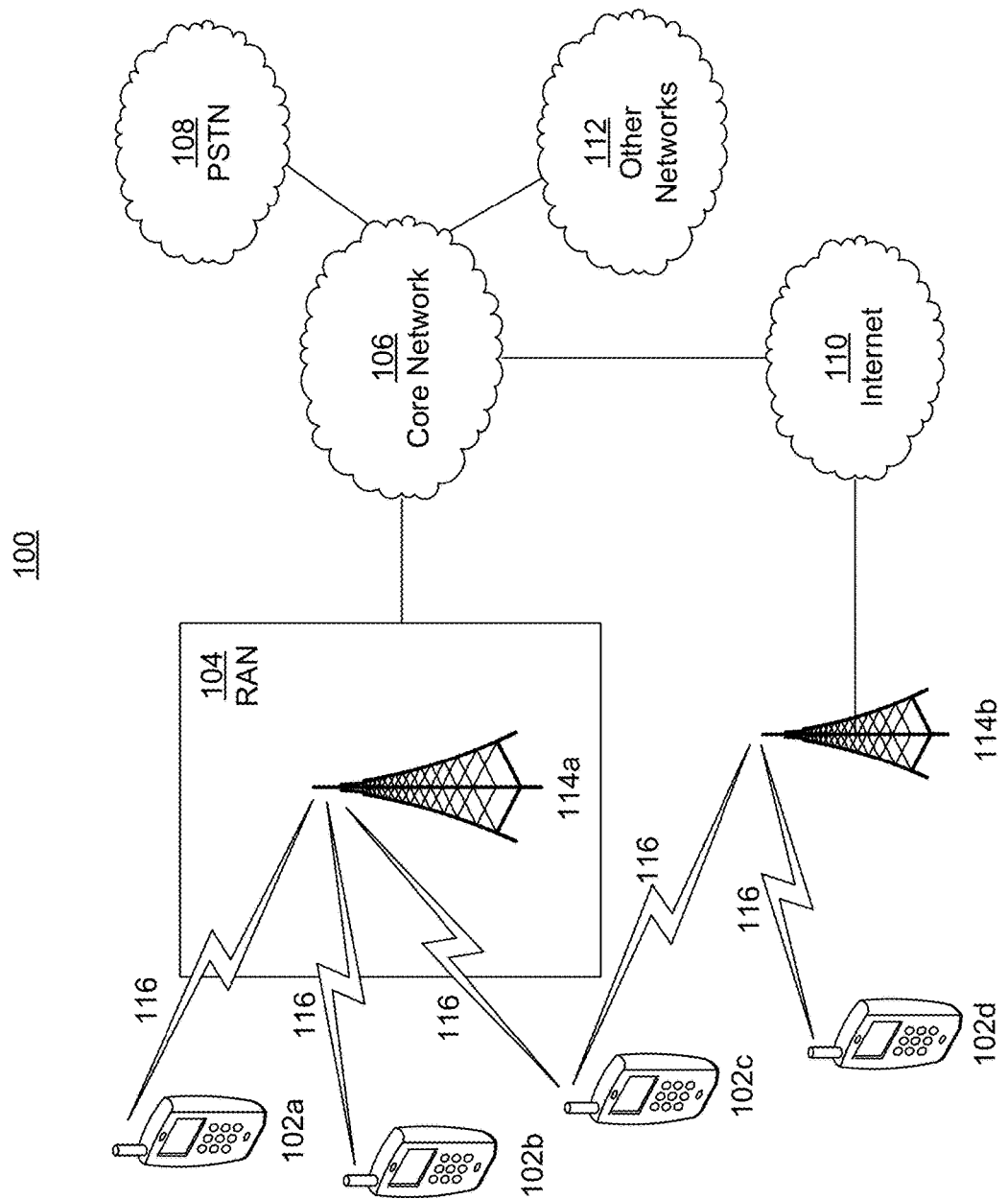
FIG. 1A is a system diagram illustrating an example communications system in which one or more disclosed embodiments may be implemented.

A detailed description of illustrative embodiments will now be described with reference to the various Figures. Although this description provides a detailed example of possible implementations, it should be noted that the details are intended to be exemplary and in no way limit the scope of the application.

The following abbreviations are used herein:
ΔF Sub-carrier spacing
5gFlex 5G Flexible Radio Access Technology
5gNB 5GFlex NodeB
ACK Acknowledgement
BLER Block Error Rate
BRS Beam Reference Signal
BTI Basic TI (may be in integer multiple of one or more symbol duration)
CB Contention-Based (e.g. access, channel, resource)
CBRA Contention Based Random Access
CFRA Contention Free Random Access
CoMP Coordinated Multi-Point transmission/reception
CP Cyclic Prefix
CP-OFDM Conventional OFDM (relying on cyclic prefix)
CQI Channel Quality Indicator
CN Core Network (e.g. LTE packet core)
CRC Cyclic Redundancy Check
CSG Closed Subscriber Group
CSI Channel State Information
CU Central Unit
D2D Device to Device transmissions (e.g. LTE Sidelink and/or the like.)
DCI Downlink Control Information
DL Downlink
DM-RS Demodulation Reference Signal
DRS Discovery Reference Signal
DRB Data Radio Bearer
DU Distributed Unit
EPC Evolved Packet Core
FBMC Filtered Band Multi-Carrier
FBMC/OQAM A FBMC technique using Offset Quadrature Amplitude Modulation
FDD Frequency Division Duplexing
FDM Frequency Division Multiplexing
ICC Industrial Control and Communications
ICIC Inter-Cell Interference Cancellation
IS In-Sync
IP Internet Protocol
LAA License Assisted Access
LBT Listen-Before-Talk
LCH Logical Channel
LCP Logical Channel Prioritization
LLC Low Latency Communications
LTE Long Term Evolution
MAC Medium Access Control
NACK Negative ACK
NS No-Sync
MC MultiCarrier
MCS Modulation and Coding Scheme
MIMO Multiple Input Multiple Output
MTC Machine-Type Communications
NAS Non-Access Stratum
NR New Radio
OFDM Orthogonal Frequency-Division Multiplexing
OOB Out-Of-Band (emissions)
OOS Out-Of-Sync
Pcmax Total available UE power in a given TI
PHY Physical Layer
PRACH Physical Random Access Channel
PDU Protocol Data Unit
PER Packet Error Rate
PLMN Public Land Mobile Network
PLR Packet Loss Rate
PSS Primary Synchronization Signal
QoS Quality of Service
RAB Radio Access Bearer
RAN PA Radio Access Network Paging Area
RACH Random Access Channel (or procedure)
RAR Random Access Response
RCU Radio access network Central Unit
RF Radio Front end
RLF Radio Link Failure
RLM Radio Link Monitoring
RNTI Radio Network Identifier
RRC Radio Resource Control
RRM Radio Resource Management
RS Reference Signal
RTT Round-Trip Time
SCMA Single Carrier Multiple Access
SDU Service Data Unit
SOM Spectrum Operation Mode
SS Synchronization Signal
SSS Secondary Synchronization Signal
SRB Signaling Radio Bearer
SUL Supplementary Uplink
SWG Switching Gap (e.g. in a self-contained subframe)
TB Transport Block
TBS Transport Block Size
TDD Time-Division Duplexing
TDM Time-Division Multiplexing
TI Time Interval
TTI Transmission Time Interval
TRP Transmission/Reception Point
TRPG Transmission/Reception Point Group
TRx Transceiver
UFMC Universal Filtered Multicarrier
UF-OFDM Universal Filtered OFDM
UL Uplink
URC Ultra-Reliable Communications
URLLC Ultra-Reliable and Low Latency Communications
V2V Vehicle to vehicle communications
V2X Vehicular communications
WLAN Wireless Local Area Networks and related technologies (IEEE 802.xx domain)

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
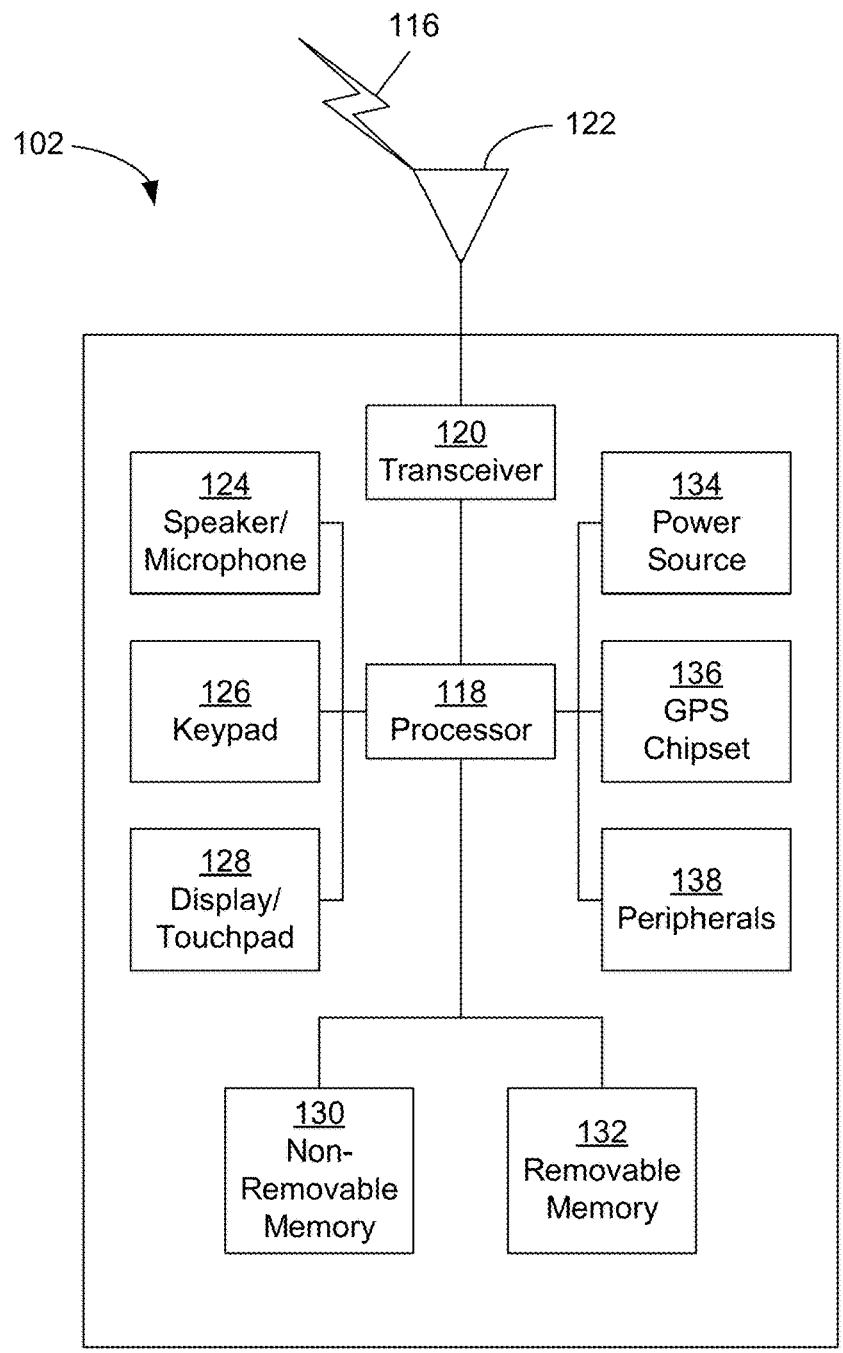
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
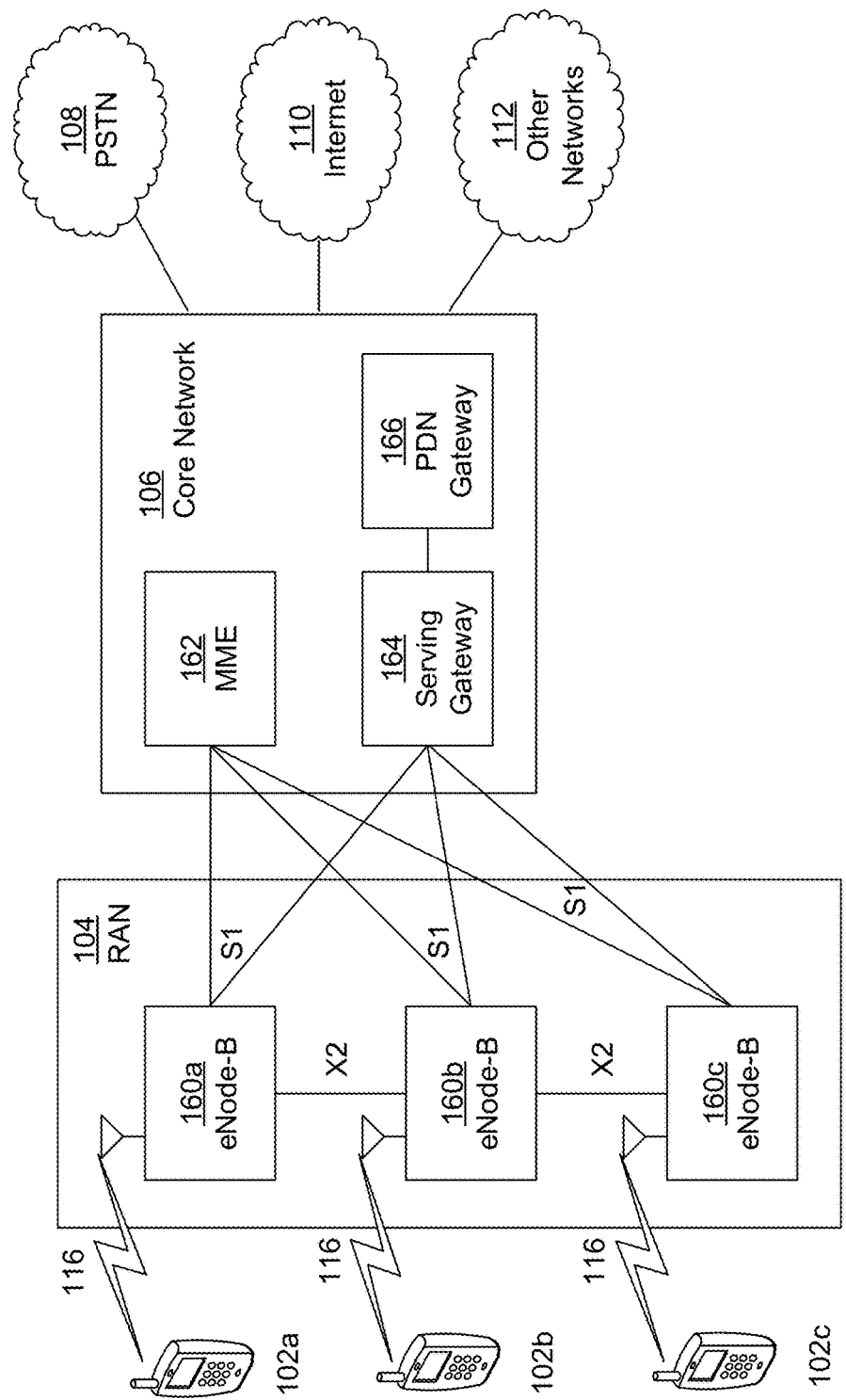
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
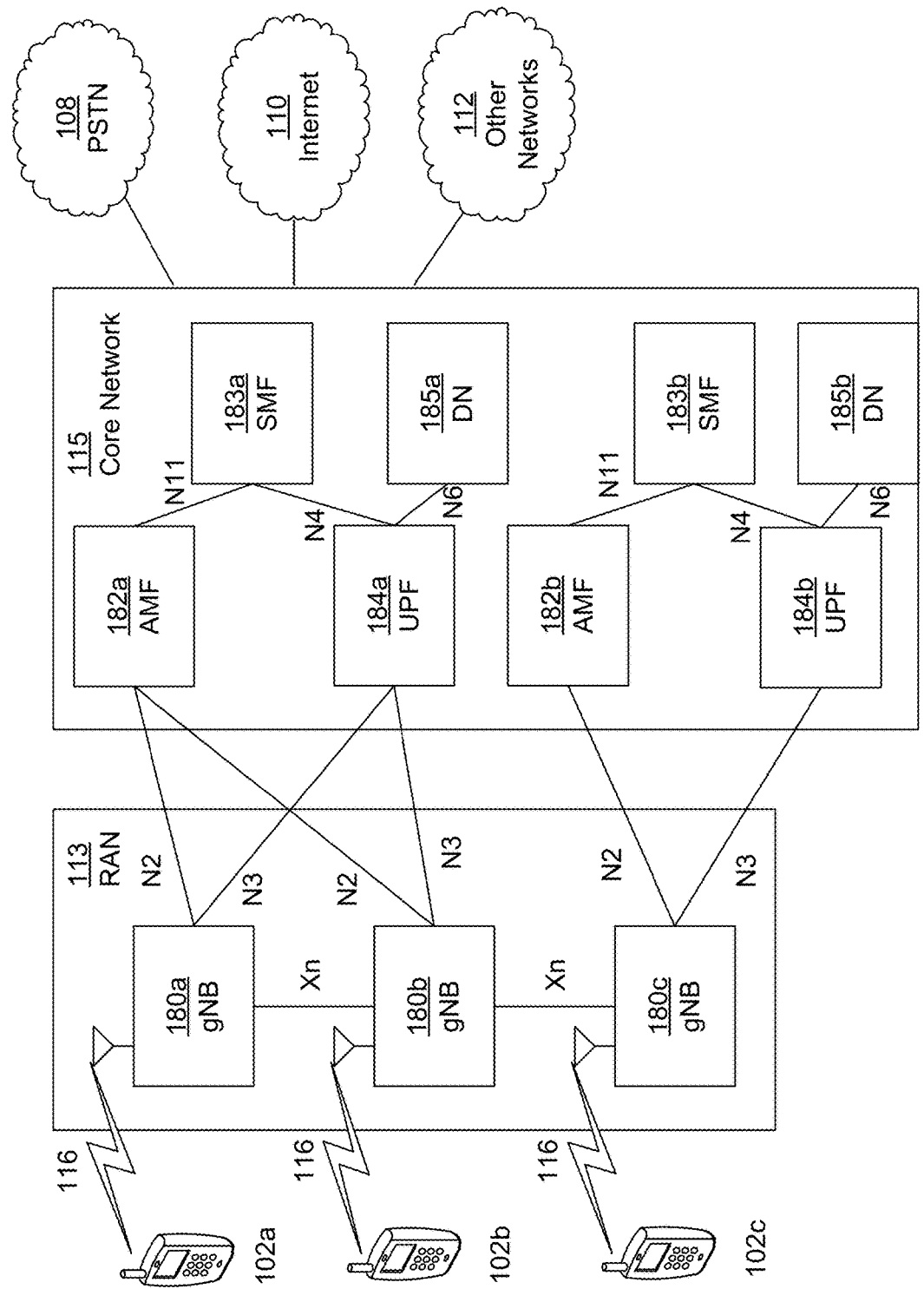
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A wireless transmit/receive unit (WTRU) may be used for performing a measurement in a connected mode. The WTRU may comprise a memory and a processor. The processor may be configured to perform a number of WTRU actions as described herein. A measurement configuration comprising a cell strength of a serving cell and a load threshold for the serving cell may be received. It may be determined whether a measurement condition exists. The measurement condition may indicate whether a reference signal received power (RSRP) of the serving cell may be less than the cell strength of the serving cell and/or or a load of the serving cell may be greater than the load threshold for the serving cell (e.g., possibly in combination). A neighboring cell measurement may be performed when the measurement condition exists. A WTRU may refrain from performing neighboring cell measurements m when the measurement condition is not satisfied.

The cell strength of the serving cell may be at least one of a serving cell link quality, and a serving measure (s-measure). The load threshold for the serving cell may be a serving occupancy (s-occupancy) threshold. The load threshold for the serving cell may be a serving channel occupancy threshold. The load threshold for the serving cell may be a number of failed Listen-Before-Talk (LBT) procedures associated with the serving cell.

A wireless transmit/receive unit (WTRU) may be used for performing a measurement in a connected mode. The WTRU comprising may comprise a memory and a processor. The processor may be configured to perform a number of actions. A measurement configuration comprising a cell strength of a serving cell and a load threshold for the serving cell may be received. It may be determined whether a measurement condition exists. The measurement condition may indicate whether a reference signal received power (RSRP) of the serving cell may be less than the cell strength of the serving cell, or a load of the serving cell may be greater than the load threshold for the serving cell. A neighboring cell measurement may be determined when the measurement condition exists. A measurement report may be sent that may include the neighboring cell measurement to a base station or eNode-B.

A measurement reporting event based on the load of the serving cell and a load of a neighboring cell may be determined. The measurement reporting event may indicate that the measurement report should be sent. The measurement report that may include the neighboring cell measurement may be sent to the base station or eNode-B when the measurement reporting event indicates that the measurement report should be sent.

A measurement reporting event associated with a comparison of a serving cell channel occupancy and a neighbor cell channel occupancy may be determined. The measurement reporting event may be a comparison of the load of the serving cell and the load of the neighboring cell. The measurement event, which may be determined, may be associated with a first comparison of a serving cell channel occupancy with a first threshold, and a second comparison of a neighbor cell occupancy with a second threshold.

A wireless transmit/receive unit (WTRU) may be used for performing a measurement in a connected mode. The WTRU comprising may comprise a memory and a processor. The processor may be configured to perform a number of actions. A measurement configuration comprising a cell strength of a serving cell and a load threshold for the serving cell may be received. It may be determined whether a measurement condition exists. The measurement condition may indicate whether a reference signal received power (RSRP) of the serving cell may be less than the cell strength of the serving cell, or a load of the serving cell may be greater than the load threshold for the serving cell. A neighboring cell measurement may be performed when the measurement condition exists. A measurement reporting event may be determined based on the load of the serving cell and a load of a neighboring cell. A measurement reporting event may be determined based on the load of the serving cell and the load of the neighboring cell. A measurement report may be sent that may include the neighboring cell measurement to a base station or eNode-B. A measurement configuration that comprises a sub-band report value that indicates one or more sub-bands that satisfy a channel occupancy criterion may be received.

The measurement report may comprise a channel occupancy. The measurement report may comprise a first channel occupancy for the serving cell on a per sub-band basis, and a second channel occupancy for the neighboring cell on a per sub-band basis. The measurement report may comprise a first channel occupancy for the serving cell on a per beam basis, and a second channel occupancy for the neighboring cell on a per beam basis. The measurement report may comprise at least one of a set of physical resource blocks, a frequency, a bandwidth, a set of reference signals, a bandwidth part, and a sub-band.

A network, for example, may refer to one or more networks nodes, such as gNBs, which in turn may be associated with one or more Transmission/Reception Points (TRPs) or any other node in the RAN.

The term shared spectrum may refer to spectrum that may be shared between multiple network operators and/or multiple technologies (e.g., 3GPP, WiFi, radar, satellite, and/or the like) and may include lightly licensed spectrum, licensed spectrum that may be shared between operators, and/or unlicensed spectrum. The terms shared and unlicensed may be used interchangeably in this disclosure.

Transmit Power Control (TPC) may be a regulatory requirement in some regions by which a WTRU may reduce its transmit power, such as in increments of 3 dB or 6 dB, compared to a maximum nominal transmit power.

The term Reference Signal (RS) in this disclosure may refer to a signal (e.g. any signal), preamble or system signature that may be received and/or transmitted by the WTRU, for example, for one or more purposes described herein. Different RSs may be provided for beam management in the Downlink (DL) and Uplink (UL), respectively. For example, DL beam management may use a Channel State Information-Reference Signal (CSI-RS), a Demodulation Reference Signal (DMRS), a synchronization signal, and/or the like. UL beam management may use a Sounding Reference Signal (SRS), the DMRS, a Random Access Channel (RACH) signal, and/or the like.

Next generation air interfaces, including further evolution of LTE-A Pro and NR, may be expected to support a wide range of use cases with varying service requirements, such as low overhead-low data rate power efficient services for massive Machine-Type Communication (mMTC), Ultra-Reliable Low Latency services (URLLC), high data rate mobile broadband services (eMBB), and/or the like. Such service requirements may facilitate diverse WTRU capabilities, such as low power-low bandwidth WTRUs, WTRUs capable of very wide bandwidth (e.g., 80 Mhz), WTRUs that may support high frequencies (e.g., greater than 6 Ghz), WTRUs that may support different spectrum usage models (e.g., licensed, unlicensed/shared, etc.) under various mobility scenarios (e.g., stationary/fixed, high speed trains, etc.) using an architecture that may be flexible enough to adapt to diverse deployment scenarios (e.g., standalone, non-standalone with assistance from a different air interface, centralized, virtualized, distributed over ideal/non-ideal backhaul, etc.), and/or the like.

In the case of an NR air interface, a WTRU may operate using Bandwidth Parts (BWPs) in a carrier. The WTRU may access a cell using an initial BWP. It may then be configured with a set of BWPs to continue operation. At any given moment, the WTRU may have one active BWP. A BWP (e.g. each BWP) may be configured with a set of Control-Resource Sets (CORESETs) within which the WTRU may blind decode Physical Downlink Control Channel (PDCCH) candidates for scheduling, among other things.

The NR interface may support variable transmission duration and feedback timing. With variable transmission duration, a Physical Downlink Shared Channel (PDSCH) reception or a Physical Uplink Shared Channel (PUSCH) transmission may occupy a contiguous subset of symbols of a slot. With variable feedback timing, the Downlink Control Information (DCI) for a DL assignment may include an indication for the timing of the feedback for the WTRU, by, for example, pointing to a Physical Uplink Control Channel (PUCCH) resource.

The NR interface may support one or more types (e.g. two types) of PUCCH resources, such as a short PUCCH and a long PUCCH. The former may be transmitted using 1 or 2 Orthogonal Frequency Division Multiplexing (OFDM) symbols, while the latter may use up to 14 OFDM symbols. A PUCCH type (e.g. each PUCCH type) may have one or more (e.g. multiple) formats, which may depend on the type and/or size of corresponding payload.

Beamforming may be used to compensate increased pathloss at higher frequencies, such as frequencies greater than 6 GHz. A number of antenna elements may be used to achieve higher beamforming gain.

Analog and/or hybrid beamforming may be used to reduce implementation cost by, for example, reducing the number of radio frequency (RF) transmitting chains. Analog and/or hybrid beams may be multiplexed in time. Beamforming may be applied for a sync channel, a Physical Broadcast Channel (PBCH), and/or control channels to provide cell wide coverage. The term beam sweep in this disclosure may refer to transmission or reception of beamformed channels multiplexed in time, frequency, space, and/or the like.

LTE operation and/or NR operation may include transmission and/or reception in unlicensed spectrum, including initial access, scheduling/Hybrid Automatic Repeat Request (HARQ). Operation may include mobility and coexistence methods with NR/LTE License Assisted Access (LTE-LAA) and other incumbent RATs. Scenarios that may be considered may include an NR-based LAA cell connected with an LTE or NR anchor cell, as well as an NR-based cell operating standalone in an unlicensed spectrum. As such, the disclosed embodiments contemplate various deployment scenarios. For example, the unlicensed spectrum may include one or more NR based (e.g. different standalone NR-based) operators or carriers. Alternatively, or additionally, the unlicensed spectrum may include different variants of dual connectivity operation (e.g., E-UTRAN New Radio-Dual Connectivity (EN-DC)) with at least one carrier operating according to an LTE radio access technology (RAT). In an embodiment, the unlicensed spectrum may include NR-Dual Connectivity (NR-DC) with at least two sets of one or more carriers operating according to the NR RAT. In an embodiment, the unlicensed spectrum may include different variants of carrier aggregation (CA), possibly including different combinations of carriers of each of LTE and NR RATs.

Operation in a shared spectrum deployment may be provided. Operation in an unlicensed frequency band may be subject to some parameters on the TPC, the RF output power and power density given by the mean Effective Isotropic Radiated Power (EIRP), the mean EIRP density at a high power level (e.g. the highest power level), and/or the like. Operation may further be subject to one or more parameters on the transmitters out of band emissions. The one or more may be associated with bands and/or geographical locations.

Operation may be further subject to requirements on the Nominal Channel Bandwidth (NCB) and the Occupied Channel Bandwidth (OCB), which may be used for unlicensed spectrum in the 5 GHz region. The NCB, which may refer to the widest band of frequencies inclusive of guard bands assigned to a single channel, may be at least 5 MHz (e.g. at all times). The OCB, which may refer to the bandwidth containing 99% of the power of the signal, may be between 80% and 100% of the declared NCB. During an established communication, the WTRU may be allowed to operate temporarily in a mode where its OCB may be as low as 40% of its NCB with a minimum of 4 MHz.

Channel access in an unlicensed frequency band may use a Listen-Before-Talk (LBT) mechanism. LBT may be used prior to a channel access (e.g. each channel access) whether the channel may or may not be occupied. The LBT procedure may be a mechanism by which the WTRU performs a check, such as a Clear Channel Assessment (CCA), before using a frequency band or channel. The CCA may utilize at least energy detection to determine the presence or absence of other signals on the channel to determine if the channel may be occupied or clear. European and/or Japanese regulations may require the usage of LBT in unlicensed bands. Carrier sensing via LBT may be used to facilitate sharing (e.g. fair sharing) of the unlicensed spectrum. LBT may facilitate fair and friendly operation in the unlicensed spectrum and may provide a global solution framework.

For frame-based systems, the WTRU may evaluate criteria as part of the LBT process, such as a CCA time (e.g., approximately 20 μs), a channel occupancy time (e.g., between 1 ms and 10 ms), an idle period (e.g., minimum 5% of channel occupancy time), a fixed frame period (e.g., the channel occupancy time plus idle period), a short control signaling transmission time (e.g., a maximum duty cycle of 5% within an observation period of 50 ms), a CAA energy detection threshold, and/or the like. For load-based systems (e.g., systems in which the transmit/receive structure may not be fixed in time), the WTRU may determine a number N of clear idle slots in extended CCA rather than the fixed frame period. N may be selected randomly within a range.

In unlicensed spectrum, channel availability may not be guaranteed. To promote channel availability, regions such as Europe and Japan may prohibit continuous transmission and may impose limits on the maximum duration of a transmission burst in the unlicensed spectrum. Discontinuous transmission with limited maximum transmission duration may be a feature of LAA.

As there may be an amount (e.g. a large amount) of bandwidth available in an unlicensed spectrum, carrier selection may be used for LAA nodes to select the carriers with low interference and that may achieve co-existence with other unlicensed spectrum deployments.

Radio resource management (RRM) measurements, which may include cell identification, may enable mobility between serving cells and may provide robust operation in the unlicensed band. A WTRU operating in an unlicensed spectrum may support frequency/time estimation and/or synchronization to enable RRM measurements and successful reception of information on the unlicensed band.

Deployments in an unlicensed spectrum may include sharing a frequency band by two or more operators and/or two or more 3GPP (e.g. LTE/NR) and non-3GPP wireless systems (e.g. WiFi, radar etc.), which may or may not be coordinated. A transmission in unlicensed spectrum may be preceded by LBT to provide co-existence with 3GPP and non-3GPP neighbors (e.g. WiFi).

In licensed spectrum, access to the cell may be controlled by a network/gNB. In unlicensed spectrum, the access to the medium may not be not guaranteed, even for a gNB. Such non-guaranteed access to the medium may cause that the WTRU consider the signal quality of the serving cell and the ability of the gNB to access the medium.

In licensed spectrum, the WRTRU may determine cell quality based on RS power and/or quality. This may ensure that the WTRU may camp on a cell (e.g. a best cell) and minimize interference to a neighbor cell. In unlicensed spectrum, the UE may camp on or reselect to a cell in a frequency shared by two or more operators and/or technologies. This may not be optimal for network performance, but may allow coexistence. For example, the WTRU may increase collisions/access delay for other systems that may be deployed on a frequency (e.g. the same frequency).

As discussed herein, when attempting to access resources in an unlicensed spectrum, the WTRU may perform one or more checks to determine channel availability. The WTRU may be configured to perform radio resource management and/or IDLE/INACTIVE mobility when considering the channel status associated with a serving cell and/or frequency. In an embodiment, the channel status may be defined by channel occupancy or channel availability.

The channel occupancy or channel availability metric may indicate a hypothetical probability of successfully accessing the unlicensed spectrum (or portions thereof) or having a successful CCA or successful LBT within an upper time bound.

In an embodiment, the channel occupancy may be defined as percentage of Received Signal Strength Indication (RSSI) samples within a time window above a preconfigured threshold. Channel availability may be defined as percentage of RSSI samples within a time window below a threshold (e.g. a preconfigured threshold).

In an embodiment, channel availability may be defined as a function of the number of free clear channel time slots (e.g., total or consecutive) within a time window. Channel occupancy may be defined as a function of the number of time slots (e.g., total or consecutive) within a time window that failed CCA.

In an embodiment, the channel occupancy or channel availability metric may be a function of historical LBT failures and/or successes. For example, the channel occupancy may be a ratio of the number of LBT failures to LBT attempts within the last X ms and/or last X attempts. The channel availability may be a ratio of LBT successes to LBT attempts within last X ms and/or last X attempts. The LBT failures may be counted when performing UL transmissions, which may include a scheduling request, random access (RA), uplink data transmission, and/or the like.

The WTRU may perform the channel occupancy or channel availability measurement on a configurable time and/or frequency resource, such as a specific time window preconfigured by the network. In an embodiment, the WTRU may receive a configuration of a time window from a system information broadcast or in a dedicated Radio Resource Control (RRC) signaling. The WTRU may average the results from one or more samples within a time window (e.g. the same time window) or average the results across one or more time windows. The WTRU may perform a weighted average of the results (e.g., use higher weights for more recent measurements). In an embodiment, the WTRU may be configured not to expect a transmission (e.g. any transmissions) from the serving cell during a time window. This may enable the WTRU to determine interference caused by transmissions from one or more other nodes and/or one or more other technologies in the unlicensed spectrum.

A WTRU may determine channel status based on a signal detection. For example, a WTRU may detect a wake up signal (WUS) and/or a channel occupancy time (COT) indication signal to evaluate the channel load. The WTRU may receive a preamble signal from one or more other access points, and may decode the preamble to identify the PCI/PLMN of the transmitter.

The WTRU may perform one or more of the following. The WTRU may report to a network (e.g., a gNB) the number of preambles detected per unit of time. The WTRU may report (e.g., further report) the number of preamble detected per unit of time for a (e.g., each) cell and/or PLMN. If the WTRU determines the channel occupancy time (COT) structure from the received preamble, the WTRU may report the time (e.g., percentage of time) occupied by neighboring transmitters. The WTRU may transmit (e.g., further transmit) the identity of the most interfering cell(s). The WTRU may transmit the sub-band with the measured RSSI, such as the highest measured RSSI (e.g., sub-band ID or an indication of the frequency band), to assist the network in the frequency allocation.

Figure 3:
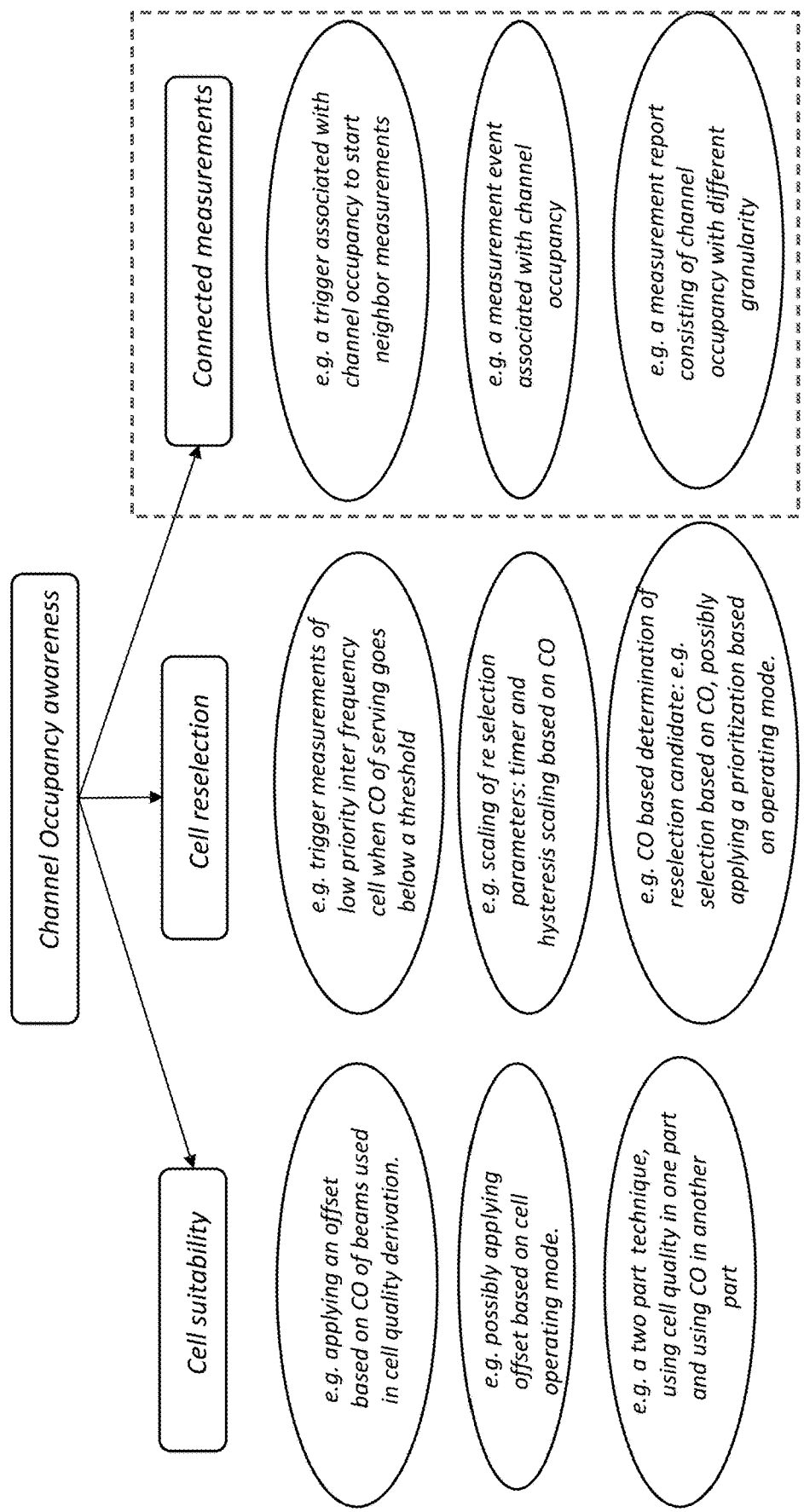
FIG. 3 illustrates an example channel occupancy awareness determination, e.g., based on cell suitability, cell reselection, connected measurements.

FIG. 3 illustrates an example channel occupancy awareness determination, for example, based on cell suitability, cell reselection, connected measurements, and/or the like. A WTRU may determine cell suitability based on one or more of the following. A WTRU may determine cell suitability based on considering channel occupancy of the serving cell/frequency. In examples, a WTRU may determine cell suitability by applying one or more offsets based on CO of beams used in a cell quality derivation. In examples, a WTRU may determine cell suitability by applying one or more offsets based on cell operation mode. In examples, a WTRU may determine cell suitability based on cell quality and/or CO (e.g., two-part procedure).

A WTRU may use channel occupancy during cell reselection including one or more of the following. A WTRU may perform cell reselection using CO based measurement trigger. For example, a WTRU may trigger measurements of low priority inter-frequency cell if CO of serving goes below a threshold. A WTRU may perform cell reselection using CO based scaling of re-selection parameters. For example, CO based scaling of re-selection parameters may be or may include a timer and/or a hysteresis scaling (e.g., low, medium, and high) based on CO. A WTRU may perform cell reselection using CO based determination of reselection candidates. For example, a candidate selection based on CO may apply a prioritization based on operating mode.

A WTRU may perform a connected mode measurement including one or more of the following. A WTRU may perform connected mode measurement using CO based measurement trigger. For example, the measurement trigger may initiate neighbor measurements, for example, based on channel occupancy of serving, which may be in combination with a s-measure. A WTRU may perform connected mode measurement using CO based measurement events. For example, CO based measurement events may be for serving or neighbors (e.g., in combination with cell quality). A WTRU may perform a connected mode measurement using CO reporting granularity. For example, channel occupancy reporting may be specific to BWP and/or beams.

A WTRU may derive cell quality using different granularity of channel occupancy. In examples, a WTRU may use per beam/per BWP channel occupancy for different granularity of channel. In examples, a WTRU may use (e.g., cumulatively use) one or more CO inputs from a network (e.g., a gNB). A WTRU may cumulatively use one or more CO inputs from a network (e.g., a gNB) using CO of BWP for selection of BWP, for example, during initial access/handover.

The WTRU may be configured to measure channel occupancy or channel availability at one or more (e.g. different) levels of granularity. For example, the WTRU may be configured to measure channel occupancy or channel availability at different levels of granularity for one or more serving cells and/or for one or more neighboring cells. The WTRU may be configured to measure the channel occupancy or the channel availability per carrier frequency. The frequency (or frequencies) may be the same as the serving cell(s), which may be referred to herein as intra-frequency channel occupancy/availability measurements. Alternatively, or additionally, the frequency (or frequencies) may be different from the serving cell, which may be referred to herein as inter-frequency channel occupancy/availability measurements. The carrier frequencies may belong to unlicensed bands and the WTRU may be configured with a set of sub-bands that are associated with a specific intra-frequency and/or inter-frequency carrier. An example of a sub-band in may include granularity of frequency resources used to perform CCA by the WTRU in the frequency domain. It will be appreciated that a cell (e.g. each cell) may have two or more sub-bands and that a sub-band may be smaller than or equal to a BWP.

The WTRU may be configured to maintain one or more (e.g. multiple) channel occupancy and/or channel availability measurements per cell at one or more (e.g. different) levels of granularity. For example, a WTRU may be configured to maintain channel occupancy and/or channel availability measurements per beam, per sub-band, and/or per beam/sub-band pair. In an embodiment, the WTRU may be configured to maintain multiple channel access processes (e.g., LBT processes). A process (e.g. each process) may be associated with a beam, a sub-band, a beam-sub-band pair, and/or the like.

Channel occupancy/availability may be determined and/or reported per beam. In an embodiment, the WTRU may be configured to perform one or more transmissions that may be confined to certain spatial directions or beams. As such, the WTRU may be configured to determine the channel occupancy or the channel availability per beam. In such a case, performing omni-directional channel access processes (e.g., LBT processes) may result in false alarms (e.g., false indications of high channel occupancy or low channel availability) due to exposed nodes and may result in unnecessary delays in transmissions. The WTRU may be configured to perform LBT or CCA before a transmission, using a receive beam that may be associated with the corresponding transmit beam. The WTRU may be configured to measure the channel occupancy or the channel availability at a beam level granularity, such as for a receive beam (e.g. each receive beam) for which at least one Single-Sideband (SSB) and/or CSI-RS may be received. The WTRU may be configured to perform channel occupancy or channel availability measurements for beams in a cell whose Reference Signal Received Power (RSRP) may be above a threshold, which may be preconfigured, or for one or more beams with a high RSRP (e.g. the top N beams with the highest RSRP) above a threshold (e.g. a preconfigured threshold). The WTRU may determine the beams to perform the channel occupancy or the channel availability measurements based on one or more of: a function of the Transmission Configuration Indicator (TCI) state configured for the WTRU; a Radio Link Monitoring-RS (RLM-RS) configuration; the candidate RSs configured for beam recovery; and/or WTRU capabilities, such as the number of antenna elements associated with WTRU, the number of independent RF chains, the receive/transmit beam width at the WTRU and the like.

The WTRU may determine a set of symbols on which to perform a RSSI measurement(s) (e.g., for per-beam RSSI measurement(s)). For example, the WTRU may determine a set of symbols on which to perform per-beam RSSI measurement(s) based on an association to a beam that may be determined from the RS configuration that the RSSI may be associated with. For example, the WTRU may determine which symbols to perform (e.g., per beam) RSSI measurement based on the SS/PBCH block measurement time configuration (SMTC) configuration.

The WTRU may be configured to measure and report channel occupancy or channel availability per group of beams and/or measure and report a value for a beam (e.g. each beam) of the group. The WTRU may use differential encoding of values with reference to a highest value or a predefined value. Alternatively, or additionally, the WTRU may be configured to report channel occupancy or channel availability statistics associated with the group of beams. The measured value may be reported as an average channel occupancy value or average channel availability value of one or more beams (e.g. all beams). The WTRU may be configured to measure the channel occupancy or channel availability per group of beams but may report the highest or lowest RSSI and/or channel occupancy or channel availability value among the group of beams (e.g. all beams).

The beams belonging to a group (e.g. the same group) may, for example, may be quasi-collocated in order to calculate the channel occupancy per TRP. The beams belonging to a group (e.g. the same group) may be associated with RSs belonging to the same BWP or sub-band.

The WTRU may be further configured to report channel occupancy or channel availability per receive beam or beam group at the WTRU.

Channel occupancy/ava8ilability may be determined and/or reported per sub-band. In an embodiment, the WTRU may be configured to perform transmissions that may be confined to a part of the overall cell bandwidth, such as a particular sub-band within a cell that has multiple sub-bands. In such a case, performing LBT or CCA over the cell bandwidth may not be necessary and/or may result in false alarms, increased power consumption, etc. Thus, the WTRU may be configured to perform LBT or CCA over a sub-band through which the transmission is to be carried out. For example, the WTRU may be configured to measure the channel occupancy or the channel availability over the specific sub-band. The WTRU may be configured to measure the channel occupancy or channel availability over N sub-bands. The N sub-bands may be configured in the WTRU; determined by the WTRU as a function of active BWPs; based on the RSRP associated with the sub-band being above a threshold; sub-bands associated with cell defining BWPs; and/or the like.

Channel occupancy/availability may be determined and/or reported per a beam/sub-band pair. In an embodiment, the WTRU may be configured to perform transmissions that may be confined to both the spatial domain (e.g., a beam) and frequency domain (e.g., a sub-band). The WTRU may be configured to perform LBT or CCA before a transmission using a receive beam over a sub-band associated with the corresponding transmit beam and sub-band. The WTRU may be configured to measure the channel occupancy or the channel availability at the granularity of a beam-sub-band pair. For example, the WTRU may be configured to measure the channel occupancy or the channel availability for a maximum of M beam-sub-band pairs for a cell or carrier frequency. The WTRU may be configured to measure the channel occupancy or the channel availability for a number of beams (e.g. a maximum of N beams) per sub-band and/or for a number of bands (e.g. maximum of X sub-bands) per beam. The number of sub-bands to measure per beam may be a function of RS power or quality associated with such beam and/or a function of the channel occupancy or the channel availability associated with such sub-band.

Measurement configuration for SSI and channel occupancy evaluation may be provided. A WTRU may determine a measurement configuration (e.g., for RSSI) and perform channel occupancy evaluation. A WTRU may be configured to measure and report the RSSI and/or channel occupancy in a sub-band granularity. A measurement object may be associated with a bandwidth (e.g., a specific bandwidth) where the WTRU evaluates RSSI and channel occupancy. For example, the measurement object may be associated with one or more of the following. A measurement object may be associated with a set of physical resource blocks (PRBs). For example, the PRB ID may be indicated in a measurement object (MO) configuration. A measurement object may be associated with a frequency and/or a bandwidth. For example, the frequency associated with the measurement object may be the center frequency of the bandwidth that the WTRU may be configured to measure. A measurement object may be associated with a set of RSs (e.g., confined within the bandwidth of interest). A measurement object may be associated with a bandwidth part (e.g., indicated by the BWP ID). A measurement object may be associated with a sub-band (e.g., indicated by the LBT sub-band ID) or the BWP ID and a per BWP sub-band ID.

The MO described herein may be configured with one or more measurement quantities, such as RSSI, channel occupancy, and/or the like. The MO may be associated with one or more (e.g., multiple) types of measurement quantities, such as RSRP, RSRQ, SINR, and/or the like. For example, if RS may be contained within a sub-band associated to the MO, the MO may be further associated with other or additional measurement quantities (e.g., RSRP, RSRQ, SINR, and/or the like). The measurement quantity may be used to determine a cell quality derivation (e.g., on specific sub-bands of the frequency carrier). The selection of the sub-band to determine where to perform a cell quality derivation may be based on the reception of an indication, for example, an indication of successful CCA on that specific sub-band.

A WTRU may receive a measurement reporting for the per sub-band measurement object. A MO, described herein, may be used to perform per sub-band RSSI measurement. The number of MO associated to different sub-bands in a wideband operation may be high. A high number of CO measurements and an excess of signaling due to multiple measurement reports may be induced.

A WTRU may perform CO measurement based on one or more criteria. For example, a WTRU may use one or more rules to determine over which sub-bands to perform CO measurement and reporting.

A WTRU may perform (e.g., only perform) CO measurement(s) based on one or more of the following. A WTRU may perform CO measurement(s) per a NW configuration. A WTRU may perform CO measurement(s) over the sub-bands (e.g., X best sub-bands) in a given frequency carrier. A WTRU may perform CO measurement(s) based on the sub-band where a cell specific reference signal(s) is detected. A WTRU may perform CO measurement(s) on a (e.g., each) LBT sub-band if the CO is a function of the number of clear LBT sub-bands.

A WTRU may perform (e.g., only perform) CO measurement(s) per a NW configuration. The WTRU may receive an association between a sub-band MO configuration and a RSSI/CO report configuration (e.g., in a measurement configuration in the NW configuration).

A WTRU may perform (e.g., only perform) RSSI/CO measurement over the sub-bands (e.g., X best sub-bands) in a given frequency carrier. In examples, the WTRU may report the RSSI (e.g., the average RSSI) over the up to X sub-band for a (e.g., each) given frequency carrier. In examples, the WTRU may report the RSSI (e.g., the highest RSSI) and CO results associated to the sub-band(s) (e.g., the best sub-band(s)).

A WTRU may perform CO (e.g., only perform CO) on the sub-band where a cell specific reference signal(s) is detected (e.g., the initial DL BWP of neighboring cells, where CD-SSB, MIB, SIB, etc. are transmitted)

For neighbor cells, the CO may be a function of the number of clear LBT sub-bands. For example, the WTRU may perform a measurement(s) (e.g., a CO measurement(s)) on a (e.g., each) LBT sub-band, and the CO may be the number of sub-bands that exceeds a threshold.

Method for cell quality determination may be provided. Cell quality derivation using one or more beams that may satisfy a channel occupancy/availability criterion may be provided. In the case of unlicensed spectrum, assessing cell quality based solely on signal strength may provide limited information when evaluating channel availability. This may be due to the fact that even though a beam has high RSRP, it may have higher levels of interference. As such, it may be beneficial to consider the channel occupancy or the channel availability when assessing the cell quality. For example, the WTRU may be configured to consider a beam for a cell quality determination if such beam satisfies signal strength criteria (e.g., RSRP above a threshold) and channel occupancy or channel availability criteria.

In an embodiment, the WTRU may determine cell quality based on the N beams, sub-bands or beam-sub-band pairs if the N beams, sub-bands or beam-sub-band pairs that may satisfy a criterion related to the channel occupancy or channel availability, and/or the like. For example, the WTRU may consider for a cell quality determination the beams, sub-bands, or beam-sub-band pairs whose channel occupancy may be below a threshold or whose channel availability may be above a threshold. Alternatively, or additionally, the WTRU may be configured to add a negative offset to the cell quality determination. The negative offset may be a function of channel occupancy (e.g., higher channel occupancies may correspond to a larger offset while lower occupancies may correspond to a smaller offset).

In an embodiment, the WTRU may determine cell quality based on a weighted average sum of the individual beam, sub-band, and/or beam-sub-band pair such that the quality of a (e.g. each) detected beam, sub-band or beam-sub-band pair may be above a threshold. The applied weight on a (e.g. each) beam may be a function of one or more of: the channel occupancy or channel availability of the beam, sub-band or beam-sub-band pair; the number of slots the RSRP of the beam, sub-band or beam-sub-band pair was greater than a threshold; and/or the inverse of the average interference level for a configurable X number of slots.

Figure 2:
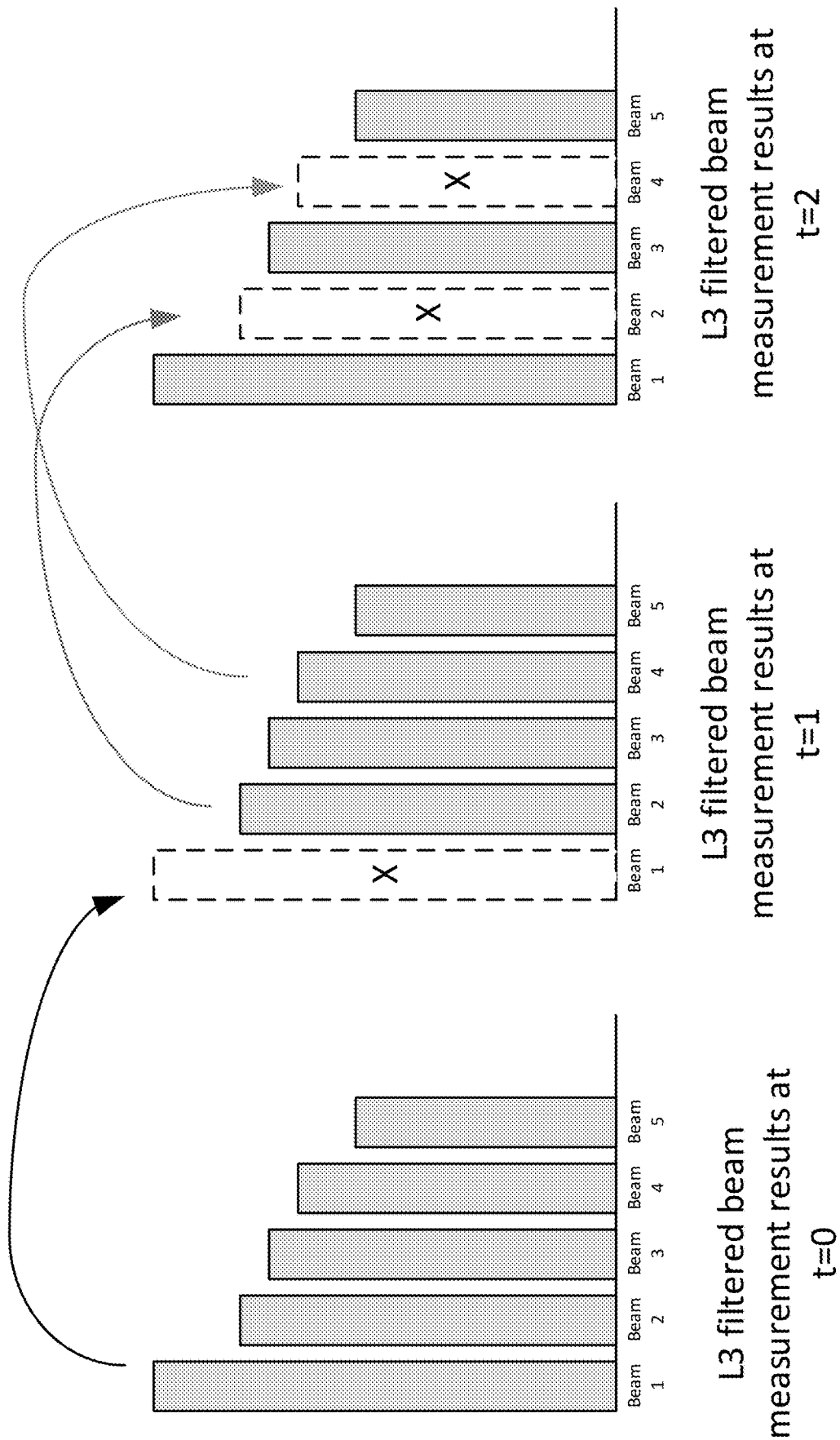
FIG. 2 is a graph illustrating an exemplary cell quality derivation with fictive beams that were not transmitted due to one or more Listen-Before-Talk (LBT) failures.

In the event of LBT failures, the RSs for cell quality determinations may not be available for a given measurement periodicity. To determine cell quality, the WTRU may use previous measurement iterations to determine an average result. The WTRU may use a virtual beam, sub-band, or beam-sub-band pair for the quality of the beam, sub-band, or beam-sub-band pair associated with RSs not received due to LBT failures (e.g., due to high RSSI, low RSRP, etc.). The quality of the virtual beam, sub-band or beam-sub-band pair may be equal to one or more of: the beam, sub-band, or beam-sub-band pair quality result of the previous measurement iteration; the average beam, sub-band, or beam-sub-band pair quality of the X configurable previous measurement iterations; the beam, sub-band, or beam-sub-band pair quality result of a CSI-RS or SSB that may be collocated to the RS not transmitted due to LBT; the maximum result of the beam, sub-band, or beam-sub-band pair above the threshold; the minimum value of the beams, sub-band, or beam-sub-band pair above the threshold; and/or the median value of the beams, sub-band, or beam-sub-band pair above the threshold. FIG. 2 depicts an example of cell quality derivation with fictive beams that may not be transmitted due to one or more LBT failures (e.g., beam 1 at t=1, and beams 2 and 4 at t=2).

In one or more embodiments, the methods for determining cell quality described herein may also be applicable for determining cell measurement results associated with a measurement quantity, such as RSRP, Reference Signal Received Quality (RSRQ), and/or Signal to Interference plus Noise Ratio (SINR). The RS used for such measurement quantities may be SSB, CSI-RS, Discovery Reference Signal (DRS), or any other downlink RS.

A WTRU may be configured to determine cumulative channel occupancy/availability using local and remote measurement results. The WTRU based measurement of channel occupancy or channel availability may provide a partial picture of interference in some instances, such as due to the presence of hidden nodes that may be visible to some nodes (e.g., a gNB) but not to the WTRU. As such, the WTRU may be configured to determine cumulative channel occupancy or channel availability using measurements available at the WTRU (which may be referred to as local measurements) and at the gNB (which may be referred to as remote measurements). For example, the WTRU may obtain the measurements performed at a gNB and/or related information via a system information broadcast. The system information broadcast may carry the channel occupancy or channel availability measurements at different levels of granularity, such as per frequency, per sub-band, per beam, and/or the like. In an embodiment, the WTRU may assume the channel occupancy or channel availability measurements in the system information broadcast may correspond to a time window (e.g. the same time window) over which the WTRU performs channel occupancy or channel availability measurements. The WTRU may determine cumulative channel occupancy or channel availability measurements as an average or as a maximum of local and/or remote measurements.

Layer filtering, such as layer 3 filtering, may be provided. For a (e.g. each) cell measurement and beam measurement quantity that the WTRU may perform, the WTRU may filter the measured result, before the evaluation of reporting criteria or measurement reporting, by the following equation (1):

$$F_n = (1-a) \cdot F_{n-31\ 1} + a \cdot M_n \quad (1)$$

Parameter $M_n$ may be the latest received measurement result from the physical layer. Parameter $F_n$ may be the updated filtered measurement result that is used for evaluation of reporting criteria or for measurement reporting. Parameter $F_{n-1}$ may be the old filtered measurement result, where Fo may be set to $M_1$ when the first measurement result from the physical layer is received. Parameter $a = \frac{1}{2}^{(h/4)}$, where $h = k + k_{offset}$, and parameter k may be the filterCoefficient for the corresponding measurement quantity received by the quantityConfig.

The offset $k_{offset}$ applied to the filter coefficient received in quantityConfig may be a function of the measured channel occupancy or channel availability in the beam or cell. The value of $k_{offset}$ may be determined by the WTRU proportionally to the channel occupancy or channel availability. The value of the offset (and accordingly of the value a) may be higher when the channel occupancy is higher (or channel availability lower), thereby decreasing the weight applied to the measured and/or filtered sample in the equation $F_n$.

In an embodiment, the WTRU may filter the measured result by the following equation (2):

$$F_n = (1 - a^* C_{n-1}) \cdot F_{n-1} + a^* C_n \cdot M_n \quad (2)$$

The value of $C_n$ may be a function of the channel occupancy or channel availability. As an example, $C_n$ may be equal to the inverse of the channel occupancy in the beam/sub-band/cell (in %). For example, the equation $$C_n = \frac{1}{C_{occupancy}}$$

may give more weight to the sample for which the channel occupancy is lower.

IDLE/INACTIVE state procedures may be provided. Cell selection procedures may be provided. A WTRU may determine cell suitability criteria that may consider the channel occupancy of the serving cell/frequency.

In an embodiment, the WTRU may be configured to influence one or more aspects of cell selection procedures by considering the channel occupancy or channel availability. For example, the WTRU may be configured apply a frequency specific offset to cell selection criteria S. The frequency specific offset may be determined based on channel occupancy or channel availability in that frequency.

For example, the cell selection criterion S in normal coverage may be fulfilled when:

Srxlev>0 and Squal>0.

Where:

Srxlev=$Q_{rxlevmeas}$−($Q_{rxlevmin}$+$Q_{rxlevminoffset}$)−$P_{compensation}$−Qoffset$_{temp}$−Qoffset$_{freq}$ Squal=$Q_{qualmeas}$−($Q_{qualmin}$+$Q_{qualminoffset}$)−Qoffset$_{temp}$−Qoffset$_{freq}$ Wherein the Qoffset$_{freq}$ may be an offset calculated based on channel occupancy/availability measurement.

| | |
|---|---|
| Srxlev | Cell selection RX level value |
| Squal | Cell selection quality value |
| Qoffset$_{temp}$ | Offset temporarily applied to a cell |
| Q$_{rxlevmeas}$ | Measured cell RX level value (RSRP) |
| Q$_{qualmeas}$ | Measured cell quality value (RSRQ) |
| Q$_{rxlevmin}$ | Minimum required RX level in the cell |
| Q$_{qualmin}$ | Minimum required quality level in the cell |
| Q$_{rxlevminoffset}$ | Offset to the signalled Q$_{rxlevmin}$ taken into account in the Srxlev evaluation as a result of a periodic search for a higher priority PLMN while camped normally in a VPLMN |
| Q$_{qualminoffset}$ | Offset to the signalled Q$_{qualmin}$ taken into account in the Squal evaluation as a result of a periodic search for a higher priority PLMN while camped normally in a VPLMN |
| P$_{compensation}$ | If the UE supports the additional Pmax in the NS-PmaxList, |

For example, the WTRU may be preconfigured with a table that maps the channel occupancy or channel availability measurement result and the Qoffset$_{freq}$ value. A channel occupancy measurement result with a higher value may correspond to a higher Qoffset$_{freq}$ value while a lower channel occupancy measurement result may correspond to a lower Qoffset$_{freq}$ value.

For the suitability criteria evaluation, Qoffset$_{freq}$ may be calculated based on a channel occupancy obtained by averaging the channel occupancy of one or more beams, such as the same beams used for the cell quality derivation.

The measured cell RX level value and the measured cell quality value may be based on the N best beams, which may be one or more beams above a threshold, such as an RSSI threshold.

In an embodiment, the WTRU may be configured with one or more criteria (e.g. two criteria) for cell selection. For example, one criteria may be based on the signal strength/quality (e.g., S criterion) and another criteria may be based on channel occupancy or channel availability criteria (e.g., C criterion). The WTRU may consider a cell for selection if it satisfies one or both S and C criteria.

The cell selection criterion for normal coverage may be fulfilled when:

Srxlev>0 and Squal>0 and Cfreq>0.

Where:

Srxlev=$Q_{rxlevmeas}$−($Q_{rxlevmin}$+$Q_{rxlevminoffset}$)−$P_{compensation}$−Qoffset$_{temp}$;

Squal=$Q_{qualmeas}$−($Q_{qualmin}$+$Q_{qualminoffset}$)−Qoffset$_{temp}$; and

Cfreq=$C_{occmax}$−$C_{meas}$.

$C_{occmax}$ may be a maximum allowed channel occupancy and $C_{meas}$ may be the measured channel occupancy by the WTRU. With regard to the $Q_{rxlevmeas}$ calculation, the WTRU may consider the beams for which the channel occupancy (channel occupancy per beam) is below a threshold. With regard to the $Q_{qualmeas}$ calculation, the WTRU may evaluate the received signal strength and interference averaged across multiple measurement periods. The number of measurement periods may be function of the load of the channel, such as the RSSI.

In an embodiment, the channel occupancy or channel availability criteria may be evaluated in terms of the interference load from neighboring nodes. For example, $C_{meas}$ may be the linear average of the noise and interference power contribution over the resource elements carrying secondary synchronization signals. $C_{meas}$ may be cell specific and may be obtained as the average of the RSSI/channel occupancy associated with one or more beams, such as the N best beams above a threshold. The N best beams may be determined based on RSRP/RSRQ, as used for the cell quality derivation, for example.

A two part cell selection procedure may be provided. In an embodiment, the WTRU may be configured perform cell selection in two parts. In a first part, the WTRU may be configured to select a carrier frequency based the channel occupancy or availability measurement. For example, the WTRU may select a carrier frequency with the lowest channel occupancy or the highest availability. Alternatively, or additionally, the WTRU may select a carrier frequency that satisfies predefined criteria, such as the channel availability being above a minimum channel availability threshold or the channel occupancy being below a maximum channel occupancy threshold. In a second part, the WTRU may select a cell with the highest signal strength and/or signal quality within the frequency selected in the first part. Alternatively, or additionally, within the frequency selected in the first part, the WTRU may select a cell that satisfies the S criteria.

A cell selection offset based on a cell's operating mode may be provided. A cell selection offset may be based on a cell's operating mode. The WTRU may be configured with one or more offsets to apply to cell selection measurements for cells operating in different modes. For example, a first offset may be applied to cells operating in a licensed mode. A second offset may be applied to cells operating in an unlicensed mode. A third offset may be applied to cells operating with licensed DL and unlicensed UL. A fourth offset may be applied to cells operating with unlicensed DL and licensed UL. A fifth offset may be applied to cells operating in shared spectrum mode. It will be appreciated that the WTRU may be configured with, and may apply, any combination of the foregoing offsets.

A cell reselection procedure may be provided. Measurement rules for cell reselection may be provided. A WTRU may limit measurement on neighbor cell based on channel occupancy.

Rules for intra-frequency neighbor measurements may be determined and/or provided. The WTRU may be further configured to perform/start/trigger intra-frequency neighbor measurements during IDLE and/or INACTIVE states based on the channel occupancy or channel availability measurement associated with the serving cell. For example, the WTRU may be configured to start intra-frequency neighbor measurements when the channel occupancy of the serving cell is higher than a preconfigured threshold or when the channel availability of the serving cell is below a preconfigured threshold. In an embodiment, the WTRU may not be required to perform intra-frequency neighbor measurements when the signal strength and/or signal quality of the serving cell is above a threshold, the channel occupancy of the serving cell is below a threshold, and/or the channel availability of the serving cell is above a threshold.

Rules for inter-frequency neighbor measurements may be determined and/or provided. In an embodiment, the WTRU may be configured to perform/start/trigger inter-frequency neighbor measurements during IDLE and/or INACTIVE state based on the channel occupancy or channel availability measurement associated with the serving cell and the reselection priority associated with the inter-frequency. For example, the WTRU may be configured to perform the measurement of inter-frequency whose reselection priority is higher than the serving frequency irrespective of the channel occupancy or channel availability of the serving cell. Alternatively or additionally, the WTRU may be configured to perform the measurement of inter-frequency whose reselection priority is lower than the serving frequency when the signal strength/quality of the serving cell is below a threshold, when the channel occupancy of the serving cell is above a threshold, and/or when the channel availability of the serving cell is below a threshold.

Channel occupancy/availability based scaling of cell reselection parameters may be provided. The WTRU may be configured determine cell reselection parameters based on a channel occupancy state, which may be classified as low, medium or high. The WTRU may be preconfigured with a range of channel occupancy values that may be associated with the low, medium or high channel occupancy state. The WTRU determine the cell reselection parameters based on the determined channel occupancy state. For example, if the WTRU determines that the channel occupancy state is low, the WTRU may not apply scaling. If the WTRU determines that the channel occupancy state is medium, the WTRU may apply a preconfigured (e.g., via a system information block (SIB) or dedicated RRC signaling) medium scaling to T-reselection and hysteresis parameters applicable for cell reselection. If the WTRU determines that the channel occupancy state is high, the WTRU may apply a preconfigured (e.g., via a SIB or dedicated RRC signaling) high scaling to T-reselection and hysteresis parameters applicable for cell reselection.

In an embodiment, the WTRU may be configured to apply the scaling factors based on channel availability. For example, if the WTRU determines that the channel availability state is high, the WTRU may not apply scaling. If the WTRU determines that the channel occupancy state is medium, the WTRU may apply a preconfigured (e.g., via a SIB or dedicated RRC signaling) medium scaling to T-reselection and hysteresis parameters applicable for cell reselection. If the WTRU determines that the channel occupancy state is low, the WTRU may apply a preconfigured (e.g., via a SIB or dedicated RRC signaling) high scaling to T-reselection and hysteresis parameters applicable for cell reselection.

Rules for inter-frequency cell reselection based on channel occupancy/availability may be provided. For the purposes of cell reselection, the WTRU may be configured with an inter-frequency that may be higher and/or lower priority than the serving cell. As such, the WTRU may be configured to apply cell reselection as a function of channel occupancy or channel availability and the priority associated with the inter-frequency.

The WTRU may also be configured to consider a cell on a higher priority frequency for cell reselection when the channel occupancy state of the cell is medium or low. This may be for a preconfigured period (e.g., T-reselection). The WTRU may be configured to trigger cell reselection to a high priority inter-frequency cell when the serving cell channel occupancy state becomes medium or high. This may be for a preconfigured period (e.g., T-reselection).

In an embodiment, the WTRU may be configured to consider a cell on lower priority frequency for cell reselection when the channel occupancy state of the cell is low. This may occur for a preconfigured period (e.g., T-reselection). The WTRU may also be configured to trigger cell reselection to a high priority inter-frequency cell when the serving cell channel occupancy state is high. This may be for a preconfigured period (e.g., T-reselection).

In an embodiment, the WTRU may be configured to consider a cell on the equal priority frequency for cell reselection when the inter-frequency channel occupancy state is and/or stays lower than serving cell for a preconfigured time period (e.g., T-reselection).

Rules for intra-frequency cell reselection based on channel occupancy/availability may be provided. The WTRU may further be configured to perform cell reselection to intra-frequency neighbor cell based on cell ranking criteria. One or more aspects of the cell ranking criteria may be based on the channel occupancy or channel availability measurement. The cell-ranking criterion $R_s$ for a serving cell and $R_n$ for neighboring cells may be defined by:

$$R_s = Q_{meas,s} + Q_{hyst} - C_{freq}$$

$$R_n = Q_{meas,n} - Q_{offset} - C_{freq}$$

Where:

| | |
|---|---|
| $Q_{meas}$ | RSRP measurement quantity used in cell reselections. |
| $Q_{offset}$ | For intra-frequency: Equals to Qoffset$_{s,n}$, if Qoffset$_{s,n}$ is valid, otherwise this equals to zero. For inter-frequency: Equals to Qoffset$_{s,n}$ plus Qoffset$_{frequency}$, if Qoffset$_{s,n}$ is valid, otherwise this equals to Qoffset$_{frequency}$. |
| $C_{freq}$ | Frequency specific offset based on channel occupancy |

For example, the WTRU may be configured (e.g. preconfigured) with a table that maps the channel occupancy or channel availability measurement result and the $C_{freq}$ value. A higher value of $C_{freq}$ may correspond to a higher value of channel occupancy measurement result while a lower channel occupancy measurement result may correspond to a lower $C_{freq}$ value. $C_{freq}$ may be cell specific. It may be obtained by averaging the RSSI/channel occupancy associated with one or more beams, such as the N best beams above a threshold. The N best beams may be determined based on RSRP/RSRQ, as used for the cell quality derivation, for example. $Q_{meas}$ may be obtained by averaging the N best beams with RSSI or channel occupancy above a threshold (e.g., N best beams based on a threshold broadcasted in SI). The cells may be ranked according to R criteria. The WTR may trigger reselection to a cell with a better rank than the serving cell for a T-reselection duration.

Cell reselection between cells operating in different modes may be provided. In the case of cell reselection between cells operating in different modes, the WTRU may be camped on a cell operating in a first mode (e.g. licensed, unlicensed, DL unlicensed and UL licensed, DL licensed and UL unlicensed, shared spectrum, etc.). For cell reselection, it may be beneficial for a cell to continue operating with cells using the same mode. The WTRU may be configured with offsets for cells operating in different modes than a current cell's mode. For example, a WTRU camped on an unlicensed cell may be configured with a first offset applicable to other unlicensed cells. The WTRU may be configured with a second offset (or multiple offsets) applicable to cells operating in any other mode. For example, the WTRU may be configured with a different offset per operating mode type. The applicability or value of an offset to a cell's measurement or ranking may be dependent on the mode of that cell and the mode of the serving cell. Using such offsets may reduce the "ping-pong" effect between different cells of different operating modes.

The WTRU may determine the offset values based on an explicit configuration by the network. The configuration may be included in a broadcasted message (e.g. MIB or SIB). The WTRU may be semi-statically configured with a set of offset values, such as by an RRC (re)configuration. The WTRU may determine the offset values based on service type, which may be associated to a specific mode of operation. For example, the WTRU may be deployed to operate within a factory using a local unlicensed network. As such, it may be detrimental for the WTRU to camp on licensed cells when it will be served (e.g. only be served) by the unlicensed cells. The WTRU may determine the offset values based on its capabilities (e.g., the WTRU may be unable to operate in all the possible cell modes). It will be appreciated that the WTRU may determine the offset values based on any combination of the foregoing.

Upon reselecting from a cell using a first mode of operation to a cell using a second mode of operation, the WTRU may transmit an indication to the network of the mode of the cell it is currently camping on and/or a change in modes. For example, the WTRU may send a paging area update and/or the like to indicate to the network that it has switched from camping on a licensed cell to an unlicensed cell.

A paging response may be provided. The WTRU may receive paging (e.g., a paging message) while camping on a cell operating in a first mode. The paging message may indicate to the WTRU to proceed with RA on a cell operating in a second mode. For example, the WTRU may be camped on a cell operating in an unlicensed mode and may be indicate (e.g., in the paging message) an attempt to perform a random access (RA) on a cell operating in licensed mode. The WTRU may receive an indication of RA restrictions, such as via a broadcast message. As such, the WTRU may determine (e.g., autonomously) that a cell on which it is camped may be suitable to receive paging messages, but may not be suitable for a subsequent RA.

The applicable cell operating mode for RA may depend on a traffic type, which may be determined by the paging message. For example, the WTRU may be camped on a cell operating in licensed mode (e.g. possibly to ensure consistent paging performance that may be unbridled by LBT requirements). The WTRU may receive a paging message indicating that the service type is best served on an unlicensed cell. The WTRU may then attempt RA on a cell operating in an unlicensed mode.

The WTRU may attempt RA on a cell operating in a second mode while receiving paging messages on a cell operating in a first mode. As such, the WTRU may determine a relationship between the two cells. For example, the WTRU may receive an indication that the two cells (e.g., operating in different modes) may be associated. One of the cells may be camped on to receive paging message and the other may be used to attempt RA.

The WTRU may maintain different measurements and/or cell (re)selection parameters for the cell from which it may expect paging messages and the cell on which it may attempt RA. The WTRU may use different selection criteria or requirements depending on the purpose of the cell (e.g. for reception of paging message or for transmission of an RA preamble).

In a paging response message, the WTRU may be triggered to provide a measurement report, which may indicate to the network that the cell from which the WTRU received paging is not the same as that on which the WTRU performed RA.

Channel occupancy based criteria to start/report neighbor measurements may be provided. A WTRU that may be in a CONNECTED MODE may be triggered to perform neighbor cell/frequency measurements as a function channel occupancy of the serving cell/frequency. In an embodiment, the WTRU may be configured to trigger measurements associated with one or more preconfigured measurement objects when the channel occupancy of the serving cell may be above a threshold or the channel availability of the serving cell may be below a threshold. For example, the WTRU may be configured with two parameters, s-measure and s-occupancy, and the WTRU may be configured to perform neighbor measurements when the serving cell RSRP is less than the s-measure or the serving cell occupancy is greater s-occupancy, or whichever comes first.

In an embodiment, the WTRU may be configured to trigger measurements for measurement objects associated with a licensed carrier when the channel occupancy of the measurement objects associated with unlicensed carrier may be above a threshold.

In an embodiment, the WTRU may trigger neighbor measurements based on the status of one or more LBT processes. For example, the WTRU may be configured to perform neighbor measurements when the number of LBT failures are above a threshold. The WTRU may also be configured to perform neighbor measurements when a number of sub-bands, beams, or beam-sub-band pairs with LBT success associated with a serving cell is below a threshold (e.g. a predefined threshold). The WTRU may further trigger neighbor measurements when a time (e.g. a predefined time) since the last successful UL transmission (e.g., a Scheduling Request (SR), RACH, SRS, information via the UL-SCH or PUCCH) exceeds a threshold.

A WTRU may perform measurement based on one or more events associated with channel occupancy/availability. In an embodiment, the WTRU may be configured to report measurement results based on events associated with the channel occupancy or channel availability of a serving cell and/or neighbor cell/frequencies. The measurement event may be associated with a comparison of serving cell channel occupancy or channel availability with a neighbor cell channel occupancy or channel availability. For example, the measurement event may be associated with a comparison of serving cell channel occupancy or channel availability with a first threshold and/or neighbor cell channel occupancy or channel availability with a second threshold.

The WTRU may be further configured to report a neighbor cell measurement quantity (e.g., RSRP, RSRQ, SINR, etc.) if the channel occupancy of the neighbor cell may be below a preconfigured threshold. The WTRU may also be configured to report measurement quantity associated with neighbor cell beams, if the channel occupancy of the beams is below a preconfigured threshold.

In an embodiment, the number of neighbor cells reported by the WTRU may be a function of channel occupancy or channel availability of the neighbor frequency. The number of beams reported by the WTRU may be a function of channel occupancy or channel availability associated with a neighbor cell/frequency. The number of sub-bands reported by the WTRU may be a function of channel occupancy or channel availability associated with a neighbor cell/frequency.

Measurement events for bandwidth parts and/or LBT sub-bands may be provided and/or determined. The WTRU may be further configured per measurement object with a set of CSI-RS resources and/or SSBs belonging to BWP and/or sub-band of its serving cell. A set of measurement reporting events (e.g. new measurement reporting events) associated to the serving cell may allow BWP/sub-band switching in case of high channel occupancy and/or low cell quality on the WTRU's active DL BWP and/or sub-band. The measurement reporting events may include one or more of the following. The measurement reporting events may include an average value of the beams' quality in an active DL BWP and/or sub-band being above a threshold. The measurement reporting events may include an average value of the beam quality on the active DL BWP and/or sub-band being below a threshold while an average value of the beams transmitted on non-active DL BWP and/or sub-band being above a threshold. The measurement reporting events may include a channel occupancy of the active DL BWP and/or sub-band being above a threshold while channel occupancy on a non-active DL BWP and/or sub-band being below a second threshold.

The timing and/or triggering of measurement reports may be based on channel load. Measurement reports may be sent too late due to long time to triggers (TTTs). As such, in the absence of timely measurement reports, the network may be unable to prepare and send a handover command in time, which may result in handover failure.

In a cell (e.g., an unlicensed cell), the TTT may be a function of the channel load and/or RSSI in the serving cell. In such a case, the configured TTT associated with measurement reporting may be ignored. Rather than wait for the TTT, the WTRU may transmit the measurement report when a condition related to channel occupancy and/or RSSI is reached, such as the RSSI being above a threshold.

The channel load condition may be combined with radio link conditions. For example, the WTRU may ignore the TTT and transmit (e.g., immediately) the measurement report if the monitored radio link (e.g., based on RLM resources) may be below a threshold and the channel occupancy may be above another threshold.

The WTRU may ignore the TTT and transmit (e.g., immediately) the measurement report if the channel may have been acquired by the gNB while the configured TTT may be running for a given measurement report.

Beam and/or sub-band selection for initial access may be provided. Beam and/or sub-band resource selection may be based on channel occupancy/availability. The WTRU may also be configured to perform channel occupancy or channel availability measurements at a beam level granularity. The WTRU may further be configured to determine the resource for RACH procedure based on the beam level channel occupancy or channel availability measurement. For example, the WTRU may select a preamble associated with an SSB if the SSB-RSRP may be above a preconfigured threshold and the channel occupancy associated with the SSB may be below a preconfigured threshold. The WTRU may also select a preamble associated with a CSI-RS or DRS if the CSI-RSRP/DRS-RSRP may be above a threshold (e.g. a preconfigured threshold) and the channel occupancy associated with the CSI-RS or DRS may be below a threshold (e.g. preconfigured threshold).

In an embodiment, more than one sub-band may be associated with the serving cell and WTRU may be configured to perform channel occupancy or channel availability measurement at a beam level granularity. For example, the WTRU may be configured to select a random access resource in a sub-band when the channel occupancy is below a preconfigured threshold.

In an embodiment, the WTRU may fail a preconfigured number of unsuccessful LBT attempts using a specific beam, sub-band, or beam-sub-band pair. The WTRU may be configured to temporarily (e.g., for a predefined time) prohibit random access using such a beam, sub-band or beam-sub-band pair. The prohibition may be applied for contention based random access procedure. The prohibition may also be overridden for contention free random access procedure or random access procedure triggered by PDCCH order.

Beam and/or sub-band selection for handover may be provided. The WTRU may also be configured (e.g., via a handover command) with multiple BWPs in one or more target cells. The WTRU may determine the first active BWP based on the channel occupancy in a (e.g. each) configured BWP at handover (HO) execution. The WTRU may be configured with BWP specific measurement objects for the target cell prior to HO.

The WTRU may be configured with dedicated resources in more than one of the configured BWPs. As such, the WTRU may prioritize the BWPs with dedicated resources that are satisfying the channel load condition.

The WTRU may be further configured with multiple beams with Contention Free Random Access (CFRA) associated to a (e.g. each) BWP/sub-band for HO. Prior to executing a HO command, the WTRU may monitor the configured beams and select the best beam based on the RSRP value and/or the per beam channel occupancy. For example, the WTRU may first monitor the beams configured with CFRA with a channel occupancy lower than a threshold. If none of the beams' RSRP may be above a threshold and channel occupancy may be lower than an associated threshold, the WTRU may select any beam that may be deemed good. In another example, the WTRU may prioritize Contention Based Random Access (CBRA) beams over CFRA beams if the channel occupancy associated to CFRA is higher than a threshold.

A WTRU may apply channel occupancy aware radio resource management procedures described herein. For example, a WTRU may apply channel occupancy aware radio resource management procedures for NR unlicensed spectrum (NR-U), including cell reselection and measurement control.

A WTRU may perform a measurement procedure (e.g., in CONNECTED mode), including one or more of the following. A WTRU may perform a measurement procedure (e.g., in CONNECTED mode) including a trigger associated with channel occupancy to start neighbor measurements. For example, the trigger may start neighbor measurements based on channel occupancy of a serving cell, possibly in combination with s-measure. A WTRU may perform a measurement procedure (e.g., in CONNECTED mode) in response to a measurement event, for example, a measurement event associated with channel occupancy. A WTRU may determine a measurement event, which may be a measurement event associated with channel occupancy. For example, a measurement event associated with channel occupancy may be when the channel occupancy of inter-frequency becomes better than intra-frequency (e.g., possibly in combination with cell quality). A WTRU may perform a measurement procedure (e.g., in CONNECTED mode), such as sending a measurement report that may include a channel occupancy with different granularity. For example, the measurement report may include channel occupancy associated one or more BWPs and/or beams.

Figure 4:
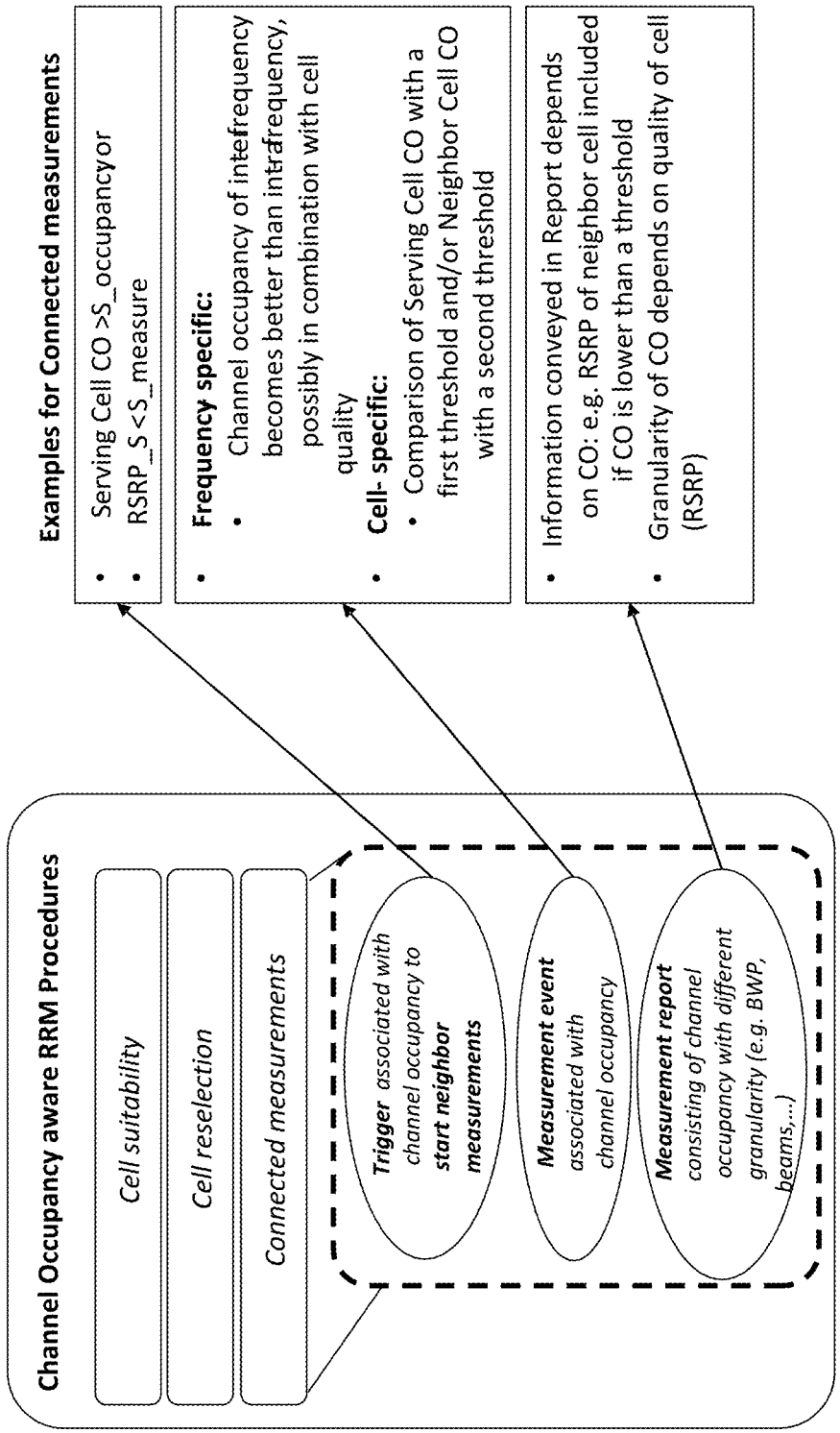
FIG. 4 illustrates an example channel occupancy aware radio resource management (RRM) procedures.

FIG. 4 illustrates an example channel occupancy aware radio resource management (RRM) procedures. Transmissions in an unlicensed spectrum may be preceded by LBT, which may enable co-existence with 3GPP and non-neighbors (e.g. WiFi). In NR, base line cell quality (e.g. RSRQ/RSRP-based), may be used for Idle/INACTIVE mobility and may not be efficient in NR-U. For example, cell quality based metrics may not capture (e.g. fully capture) the impact of one or more hidden nodes. As another example, an LBT failure, such as during a high load, may cause delays in Idle/INACTIVE functions, such as in system information (SI) reception, paging reception, RACH, and/or the like. An LBT failure may cause inaccuracies in measurement results, which may be due to loss/corruption of measurement samples and/or the like. Baseline NR RRM procedures may not be suitable for a NR-U channel, as a NR-U channel may be viewed in two or more dimensions. For example, a NR-U channel may be viewed in channel quality (e.g. good/bad) and channel load (e.g. busy/free). Disclosed herein are methods, apparatus, and systems that may be used to enhance NR RRM procedures such that they may be applicable for NR-U channels.

As shown in FIG. 4, channel occupancy aware procedures may include procedures for cell suitability, cell reselection, connect measurements, and/or the like. A trigger associated with a channel occupancy may be determined. The trigger associated with channel occupancy may start neighbor measurements. For example, a trigger to start neighbor measurement may be when a serving cell channel occupancy (CO) is greater than a S_occupancy, or when RSRP_S is less than a S_measure. A measurement event may be associated with channel occupancy. The channel occupancy may be associated with a cell, a frequency, and/or the like. For example, a measurement event may be associated with a frequency such that the measurement event may occur when a channel occupancy of inter-frequency may become better than intra-frequency. And the measurement event may also consider cell quality. As another example, a measurement event may be associated with a cell such that the measurement event may occur when a serving cell CO is above or below a threshold and/or when a neighbor cell CO is above or below a threshold. A measurement report may be sent. The measurement report may consist of a channel occupancy that may include different granularities (e.g. BWP, beams, and/or the like). Information in a measurement report may be associated with a cell occupancy. For example, an RSRP of a neighbor cell may be included in a measurement report when a CO is lower than a threshold. The granularity of CO may vary according to a quality of a cell (e.g. RSRP).

A WTRU may include a processor that may be configured to consider channel occupancy when performing one or more neighbor cell measurements. Measurement triggers, measurement events, and measurement reports may be modified in view of channel occupancy measurements at serving cell and/or neighbor cell.

A WTRU may include a processor that may be configured to trigger one or more neighbor cell measurements based on at least a channel occupancy of a serving cell being above a first threshold. Neighbor cell measurements corresponding to at least one channel occupancy measurement event may be performed. The at least one channel occupancy measurement event may comprise one or more of a channel occupancy measurement criteria, a frequency-specific channel occupancy measurement criteria, a cell-specific channel occupancy measurement criteria, and/or the like. A measurement report for the channel occupancy measurement event may be sent. The measurement report may be sent when one or more cells and/or measurements in the measurement report may be filtered based on channel occupancy measurements of the reported neighbor cells.

A WTRU may perform one or more connected mode measurements. A CO measurement may be triggered. For example, neighbor measurements may be triggered based on a channel occupancy of a serving cell. The neighbor measurement may be triggered by further considering an s-measure. A CO based measurement event may be determined. For example, a measurement event may be based on a comparison of the CO of a serving cell and the CO of a neighbor cell, and may also be based on a cell quality. A CO report may be sent and there may be CO reporting granularity. For example, a channel occupancy report may be based on one or more BWP and/or beams.

A WTRU may determine one or more cell suitability criteria when considering a channel occupancy of a serving cell and/or frequency. For example, an offset may be applied based on CO of beams that may be used in cell quality derivation. As another example, a two-part procedure may be used in which a cell quality may be determined, a CO may be determined, and an offset may be applied based on a cell operating mode.

A WTRU may use channel occupancy during a resection procedure. The procedure may include a number of actions. A measurement trigger may be CO based. For example, one or more measurements of low priority inter-frequency cell may be triggered when a CO of a serving cell goes below a threshold. CO based scaling of re-selection parameters may occur. For example, timer and hysteresis scaling may be based on CO (e.g. low, medium, high). CO based determination of reselection candidate may occur. For example, candidate selection may be based on CO, and may apply prioritize a candidate based on an operating mode.

Cell Quality derivation using different granularity of channel occupancy may be performed. For example, cell quality derivation may be performed per beam/per BWP channel occupancy, and may use cumulative CO inputs from gNB, using CO of BWP for selection of BWP during initial access/handover.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented within a wireless transmit/receive unit (WTRU) for performing a measurement, the method comprising:
   receiving a message that indicates a first threshold and a second threshold;
   receiving first channel occupancy values and second channel occupancy values, wherein each of the first channel occupancy values is associated with a respective sub-band of a number of sub-bands in a carrier frequency of a serving cell, and wherein each of the second channel occupancy values is associated with a respective sub-band of a number of sub-bands in a carrier frequency of a neighboring cell;
   determining that a measurement condition is satisfied, wherein the determination that the measurement condition is satisfied is based on a determination that an average of the first channel occupancy values exceeds the first threshold and an average of the second channel occupancy values associated with a number of sub-bands in a carrier frequency of a neighboring cell is below the second threshold, wherein the neighboring cell is associated with a neighboring node; and sending a measurement report to a network in response to the measurement condition being satisfied, wherein the measurement report indicates the average of the first channel occupancy values and the average of the second channel occupancy values.

2. The method of claim 1, wherein the message further indicates a cell strength threshold of the serving cell, and wherein the determination that the measurement condition is satisfied is further based on the determination that the average of the first channel occupancy values exceed the first threshold, the average of the second channel occupancy values is below the second threshold, and a reference signal received power (RSRP) is below the cell strength threshold.

3. The method of claim 1, wherein the first threshold comprises a first serving channel occupancy threshold and the second threshold comprises a second serving channel occupancy threshold.

4. The method of claim 1, further comprising:
determining a comparison of a first channel occupancy and a second channel occupancy.

5. The method of claim 1, further comprising:
determining a comparison of a load of the serving cell and a load of the neighboring cell.

6. The method of claim 1, wherein the number of sub-bands in the carrier frequency of the serving cell comprise a first sub-band where a first cell specific reference signal is detected and the number of sub-bands in the carrier frequency of the neighboring cell comprise a second sub-band where a second cell specific reference signal is detected.

7. The method of claim 1, wherein a first channel occupancy value is a ratio of first listen before talk (LBT) failures to first LBT attempts for a first sub-band and a second channel occupancy value is a ratio of second LBT failures to second LBT attempts for a second sub-band.

8. A wireless transmit/receive unit (WTRU) for performing a measurement, the WTRU comprising:
a processor configured to:
receive a message that indicates a first threshold and a second threshold;
determine first channel occupancy values each associated with a respective sub-band of a number of sub-bands in a carrier frequency of a serving cell and second channel occupancy values each associated with a respective sub-band of a number of sub-bands in a carrier frequency of a neighboring cell, wherein the neighboring cell is associated with a neighboring node;
determine that a measurement condition is satisfied, wherein the determination that the measurement condition is satisfied is based on at least a determination that an average of the first channel occupancy values exceeds the first threshold and an average of the second channel occupancy values is below the second threshold; and
send a measurement report to a network in response to the measurement condition being satisfied, wherein the measurement report indicates the average of the first channel occupancy values and the average of the second channel occupancy values.

9. The WTRU of claim 8, wherein the message further indicates a cell strength threshold of the serving cell, and wherein the determination that the measurement condition is satisfied is further based on the determination that the average of the first channel occupancy values exceed the first threshold, the average of the second channel occupancy values is below the second threshold, and a reference signal received power (RSRP) is below the cell strength threshold.

10. The WTRU of claim 8, wherein the processor is further configured to determine a comparison of a first channel occupancy and a second channel occupancy.

11. The WTRU of claim 8, wherein the processor is further configured to determine a comparison of a load of the serving cell and a load of the neighboring cell.

12. The WTRU of claim 8, wherein the number of sub-bands in the carrier frequency of the serving cell comprise a first sub-band where a first cell specific reference signal is detected and the number of sub-bands in the carrier frequency of the neighboring cell comprise a second sub-band where a second cell specific reference signal is detected.

13. The WTRU of claim 8, wherein a first channel occupancy value is a ratio of first listen before talk (LBT) failures to first LBT attempts for a first sub-band and a second channel occupancy value is a ratio of second LBT failures to second LBT attempts for a second sub-band.

14. A wireless transmit/receive unit (WTRU) for performing a measurement, the WTRU comprising:
a processor configured to:
receive a message that indicates a first threshold and a second threshold;
receive first channel occupancy values and second channel occupancy values, wherein each of the first channel occupancy values is associated with a respective sub-band of a number of sub-bands in a carrier frequency of a serving cell, and wherein each of the second channel occupancy values is associated with a respective sub-band of a number of sub-bands in a carrier frequency of a neighboring cell;
determine that a measurement condition is satisfied, wherein the determination that the measurement condition is satisfied is based on at least a determination that an average of the first channel occupancy values exceeds the first threshold and an average of the second channel occupancy values associated with a number of sub-bands in a carrier frequency of a neighboring cell is below the second threshold, wherein the neighboring cell is associated with a neighboring node; and
send a measurement report to a network in response to the measurement condition being satisfied, wherein the measurement report indicates the average of the first channel occupancy values and the average of the second channel occupancy values.

15. The WTRU of claim 14, wherein the message further indicates a cell strength threshold of the serving cell, and wherein the determination that the measurement condition is satisfied is further based on the determination that the average of the first channel occupancy values exceed the first threshold, the average of the second channel occupancy values is below the second threshold, and a reference signal received power (RSRP) is below the cell strength threshold.

16. The WTRU of claim 14, wherein the first threshold comprises a first serving channel occupancy threshold and the second threshold comprises a second serving channel occupancy threshold.

17. The WTRU of claim 14, wherein the number of sub-bands in the carrier frequency of the serving cell comprise a first sub-band where a first cell specific reference signal is detected and the number of sub-bands in the carrier frequency of the neighboring cell comprise a second sub-band where a second cell specific reference signal is detected.

18. The WTRU of claim 14, wherein a first channel occupancy value is a ratio of first listen before talk (LBT) failures to first LBT attempts for a first sub-band and a second channel occupancy value is a ratio of second LBT failures to second LBT attempts for a second sub-band.

* * * * *